US00RE48922E

(19) United States
(12) Reissued Patent
Dong et al.

(10) Patent Number: US RE48,922 E
(45) Date of Reissued Patent: Feb. 1, 2022

(54) LINEAR LED ILLUMINATION DEVICE WITH IMPROVED COLOR MIXING

(71) Applicant: Lutron Technology Company LLC, Coopersburg, PA (US)

(72) Inventors: Fangxu Dong, Austin, TX (US); Craig T. Phillips, San Marcos, TX (US)

(73) Assignee: Lutron Technology Company LLC, Coopersburg, PA (US)

(21) Appl. No.: 16/001,523

(22) Filed: Jun. 6, 2018

Related U.S. Patent Documents

Reissue of:
(64) Patent No.: 9,360,174
Issued: Jun. 7, 2016
Appl. No.: 14/097,339
Filed: Dec. 5, 2013

(51) Int. Cl.
*F21V 7/00* (2006.01)
*F21V 7/04* (2006.01)
(Continued)

(52) U.S. Cl.
CPC ..... *H05B 45/22* (2020.01); *F21K 9/62* (2016.08); *F21V 7/0083* (2013.01); *F21V 7/048* (2013.01);
(Continued)

(58) Field of Classification Search
CPC ..... F21K 9/54; F21V 7/0083; F21V 7/048; F21V 7/06; F21V 21/30; H05B 33/0803; H05B 33/0854; H05B 33/0857
See application file for complete search history.

(56) References Cited

U.S. PATENT DOCUMENTS 4,029,976 A 6/1977 Fish et al.
4,402,090 A 8/1983 Gfeller et al.
(Continued)

FOREIGN PATENT DOCUMENTS

CN 1291282 4/2001
CN 1396616 2/2003
(Continued)

OTHER PUBLICATIONS

International Search Report & Written Opinion, PCT/US2010/000219, dated Oct. 12, 2010.
(Continued)

*Primary Examiner* — Angela M Lie
(74) *Attorney, Agent, or Firm* — Condo Roccia Koptiw LLP

(57) ABSTRACT

A linear multi-color LED illumination device that produces uniform color throughout the output light beam without the use of excessively large optics or optical losses is disclosed herein. Embodiments for improving color mixing in the linear illumination device include, but are not limited to, a shallow dome encapsulating a plurality of emission LEDs within an emitter module, a unique arrangement of a plurality of such emitter modules in a linear light form factor, and special reflectors designed to improve color mixing between the plurality of emitter modules. In addition to improved color mixing, the illumination device includes a light detector and optical feedback for maintaining precise and uniform color over time and/or with changes in temperature. The light detector is encapsulated within the shallow dome along with the emission LEDs and is positioned to capture the greatest amount of light reflected by the dome from the LED having the shortest emission wavelength.

35 Claims, 12 Drawing Sheets

(51) Int. Cl.

| | |
|---|---|
| ***F21V 7/06*** | (2006.01) |
| ***F21V 13/04*** | (2006.01) |
| ***H05B 33/08*** | (2020.01) |
| ***F21K 99/00*** | (2016.01) |
| ***F21V 21/30*** | (2006.01) |
| ***H05B 45/22*** | (2020.01) |
| ***F21K 9/62*** | (2016.01) |
| ***H05B 45/00*** | (2020.01) |
| ***H05B 45/20*** | (2020.01) |
| ***H05B 45/10*** | (2020.01) |
| *F21Y 105/12* | (2016.01) |
| *F21Y 113/17* | (2016.01) |
| *F21Y 103/10* | (2016.01) |
| *F21Y 105/10* | (2016.01) |
| *F21Y 115/10* | (2016.01) |
| *F21Y 103/00* | (2016.01) |

(52) U.S. Cl.

CPC ..... *F21V 7/06* (2013.01); *F21V 13/04* (2013.01); *F21V 21/30* (2013.01); *H05B 45/00* (2020.01); *H05B 45/10* (2020.01); *H05B 45/20* (2020.01); *F21Y 2103/00* (2013.01); *F21Y 2103/10* (2016.08); *F21Y 2105/10* (2016.08); *F21Y 2105/12* (2016.08); *F21Y 2113/17* (2016.08); *F21Y 2115/10* (2016.08)

(56) References Cited

U.S. PATENT DOCUMENTS 4,713,841 A 12/1987 Porter et al.
4,745,402 A 5/1988 Auerbach
4,809,359 A 2/1989 Dockery
5,018,057 A 5/1991 Biggs et al.
5,103,466 A 4/1992 Bazes
5,181,015 A 1/1993 Marshall et al.
5,193,201 A 3/1993 Tymes
5,218,356 A 6/1993 Knapp
5,299,046 A 3/1994 Spaeth et al.
5,317,441 A 5/1994 Sidman
5,541,759 A 7/1996 Neff et al.
5,619,262 A 4/1997 Uno
5,657,145 A 8/1997 Smith
5,797,085 A 8/1998 Beuk et al.
5,905,445 A 5/1999 Gurney et al.
6,016,038 A 1/2000 Mueller et al.
6,067,595 A 5/2000 Lindenstruth
6,069,929 A 5/2000 Yabe et al.
6,084,231 A 7/2000 Popat
6,094,014 A 7/2000 Bucks et al.
6,094,340 A 7/2000 Min
6,108,114 A 8/2000 Gilliland et al.
6,127,783 A 10/2000 Pashley et al.
6,147,458 A 11/2000 Bucks et al.
6,150,774 A 11/2000 Mueller et al.
6,234,645 B1 5/2001 Borner et al.
6,234,648 B1 5/2001 Borner et al.
6,250,774 B1 6/2001 Begemann et al.
6,333,605 B1 12/2001 Grouev et al.
6,344,641 B1 2/2002 Blalock et al.
6,356,774 B1 3/2002 Bernstein et al.
6,359,712 B1 3/2002 Kamitani
6,384,545 B1 5/2002 Lau
6,396,815 B1 5/2002 Greaves et al.
6,414,661 B1 7/2002 Shen et al.
6,441,558 B1 8/2002 Muthu et al.
6,448,550 B1 9/2002 Nishimura
6,495,964 B1 12/2002 Muthu et al.
6,498,440 B2 12/2002 Stam et al.
6,513,949 B1 2/2003 Marshall et al.
6,577,512 B2 6/2003 Tripathi et al.
6,617,795 B2 9/2003 Bruning
6,636,003 B2 10/2003 Rahm et al.
6,639,574 B2 10/2003 Scheibe
6,664,744 B2 12/2003 Dietz
6,692,136 B2 2/2004 Marshall et al.
6,741,351 B2 5/2004 Marshall et al.
6,753,661 B2 6/2004 Muthu et al.
6,788,011 B2 9/2004 Mueller et al.
6,806,659 B1 10/2004 Mueller et al.
6,831,569 B2 12/2004 Wang et al.
6,831,626 B2 12/2004 Nakamura et al.
6,853,150 B2 2/2005 Clauberg et al.
6,879,263 B2 4/2005 Pederson et al.
6,965,205 B2 11/2005 Piepgras et al.
6,969,954 B2 11/2005 Lys
6,975,079 B2 12/2005 Lys et al.
7,006,768 B1 2/2006 Franklin
7,014,336 B1 3/2006 Ducharme et al.
7,038,399 B2 5/2006 Lys et al.
7,046,160 B2 5/2006 Pederson et al.
7,072,587 B2 7/2006 Dietz et al.
7,088,031 B2 8/2006 Brantner et al.
7,119,500 B2 10/2006 Young
7,135,824 B2 11/2006 Lys et al.
7,161,311 B2 1/2007 Mueller et al.
7,166,966 B2 1/2007 Naugler, Jr. et al.
7,194,209 B1 3/2007 Robbins et al.
7,233,115 B2 6/2007 Lys
7,233,831 B2 6/2007 Blackwell
7,252,408 B2 8/2007 Mazzochette et al.
7,255,458 B2 8/2007 Ashdown
7,256,554 B2 8/2007 Lys
7,262,559 B2 8/2007 Tripathi et al.
7,294,816 B2 11/2007 Ng et al.
7,315,139 B1 1/2008 Selvan et al.
7,319,298 B2 1/2008 Jungwirth et al.
7,329,998 B2 2/2008 Jungwirth
7,330,002 B2 2/2008 Joung
7,330,662 B2 2/2008 Zimmerman
7,352,972 B2 4/2008 Franklin
7,358,706 B2 4/2008 Lys
7,359,640 B2 4/2008 Onde et al.
7,362,320 B2 4/2008 Payne et al.
7,372,859 B2 5/2008 Hall et al.
7,400,310 B2 7/2008 LeMay
7,445,340 B2 11/2008 Conner et al.
7,511,695 B2 3/2009 Furukawa et al.
7,525,611 B2 4/2009 Zagar et al.
7,554,514 B2 6/2009 Nozawa
7,573,210 B2 8/2009 Ashdown et al.
7,583,901 B2 9/2009 Nakagawa et al.
7,606,451 B2 10/2009 Morita
7,607,798 B2 10/2009 Panotopoulos
7,619,193 B2 11/2009 Deurenberg
7,649,527 B2 1/2010 Cho et al.
7,659,672 B2 2/2010 Yang
7,683,864 B2 3/2010 Lee et al.
7,701,151 B2 4/2010 Petrucci et al.
7,737,936 B2 6/2010 Daly
7,828,479 B1 11/2010 Aslan et al.
8,013,538 B2 9/2011 Zampini et al.
8,018,135 B2 9/2011 Van De Ven et al.
8,040,299 B2 10/2011 Kretz et al.
8,044,899 B2 10/2011 Ng et al.
8,044,918 B2 10/2011 Choi
8,057,072 B2 * 11/2011 Takenaka ..... F21K 9/00 257/98
8,075,182 B2 12/2011 Dai et al.
8,076,869 B2 12/2011 Shatford et al.
8,159,150 B2 4/2012 Ashdown et al.
8,174,197 B2 5/2012 Ghanem et al.
8,174,205 B2 5/2012 Myers et al.
8,283,876 B2 10/2012 Ji
8,287,150 B2 * 10/2012 Schaefer ..... F21V 5/007 362/237
8,299,722 B2 10/2012 Melanson
8,362,707 B2 1/2013 Draper et al.
8,471,496 B2 6/2013 Knapp
8,521,035 B2 8/2013 Knapp et al.

(56) References Cited

U.S. PATENT DOCUMENTS 8,546,842 B2 * 10/2013 Higuma ..... H01L 33/641 257/100
8,556,438 B2 10/2013 McKenzie et al.
8,569,974 B2 10/2013 Chobot
8,595,748 B1 11/2013 Haggerty et al.
8,633,655 B2 1/2014 Kao et al.
8,643,043 B2 * 2/2014 Shimizu ..... F21S 8/04 257/88
8,646,940 B2 * 2/2014 Jang ..... F21V 7/0008 362/235
8,653,758 B2 2/2014 Radermacher et al.
8,657,463 B2 * 2/2014 Lichten ..... F21S 8/063 362/231
8,680,787 B2 3/2014 Veskovic
8,704,666 B2 4/2014 Baker, Jr.
8,721,115 B2 * 5/2014 Ing ..... G09F 13/14 362/241
8,749,172 B2 6/2014 Knapp
8,773,032 B2 7/2014 May et al.
8,791,647 B2 7/2014 Kesterson et al.
8,807,792 B2 * 8/2014 Cho ..... F21V 7/0058 362/235
8,816,600 B2 8/2014 Elder
8,820,962 B2 * 9/2014 Kang ..... F21V 3/00 362/236
8,911,160 B2 * 12/2014 Seo ..... G02F 1/133603 359/642
9,004,724 B2 * 4/2015 Gao ..... F21V 3/00 313/113
9,074,751 B2 * 7/2015 Son ..... F21V 14/006
9,247,605 B1 1/2016 Ho et al.
9,557,214 B2 1/2017 Ho et al.
9,578,724 B1 2/2017 Knapp et al.
9,651,632 B1 5/2017 Knapp et al.
9,736,903 B2 8/2017 Lewis et al.
9,769,899 B2 9/2017 Ho et al.
2001/0020123 A1 9/2001 Diab et al.
2001/0030668 A1 10/2001 Erten et al.
2002/0014643 A1 2/2002 Kubo et al.
2002/0033981 A1 3/2002 Keller et al.
2002/0047624 A1 4/2002 Stam et al.
2002/0049933 A1 4/2002 Nyu
2002/0134908 A1 9/2002 Johnson
2002/0138850 A1 9/2002 Basil et al.
2002/0171608 A1 11/2002 Kanai et al.
2003/0103413 A1 6/2003 Jacobi, Jr. et al.
2003/0122749 A1 7/2003 Booth, Jr. et al.
2003/0133491 A1 7/2003 Shih
2003/0179721 A1 9/2003 Shurmantine et al.
2004/0044709 A1 3/2004 Cabrera et al.
2004/0052076 A1 3/2004 Mueller et al.
2004/0052299 A1 3/2004 Jay et al.
2004/0101312 A1 5/2004 Cabrera
2004/0136682 A1 7/2004 Watanabe
2004/0201793 A1 10/2004 Anandan et al.
2004/0220922 A1 11/2004 Lovison et al.
2004/0257311 A1 12/2004 Kanai et al.
2005/0004727 A1 1/2005 Remboski et al.
2005/0030203 A1 2/2005 Sharp et al.
2005/0030267 A1 2/2005 Tanghe et al.
2005/0053378 A1 3/2005 Stanchfield et al.
2005/0077838 A1 4/2005 Blumel
2005/0110777 A1 5/2005 Geaghan et al.
2005/0169643 A1 8/2005 Franklin
2005/0200292 A1 9/2005 Naugler, Jr. et al.
2005/0207157 A1 9/2005 Tani
2005/0242742 A1 11/2005 Cheang et al.
2005/0265731 A1 12/2005 Keum et al.
2006/0145887 A1 7/2006 McMahon
2006/0164291 A1 7/2006 Gunnarsson
2006/0198463 A1 9/2006 Godin
2006/0220990 A1 10/2006 Coushaine et al.
2006/0227085 A1 10/2006 Boldt, Jr. et al.
2007/0040512 A1 2/2007 Jungwirth et al.
2007/0109239 A1 5/2007 den Boer et al.
2007/0132592 A1 6/2007 Stewart et al.
2007/0139957 A1 6/2007 Haim et al.
2007/0248180 A1 10/2007 Bowman et al.
2007/0254694 A1 11/2007 Nakagwa et al.
2007/0268429 A1 11/2007 So
2007/0279346 A1 12/2007 den Boer et al.
2008/0061717 A1 3/2008 Bogner et al.
2008/0078733 A1 * 4/2008 Nearman ..... G09F 9/33 211/189
2008/0107029 A1 5/2008 Hall et al.
2008/0120559 A1 5/2008 Yee
2008/0136334 A1 6/2008 Robinson et al.
2008/0136770 A1 6/2008 Peker et al.
2008/0136771 A1 6/2008 Chen et al.
2008/0150864 A1 6/2008 Bergquist
2008/0186898 A1 8/2008 Petite
2008/0222367 A1 9/2008 Co
2008/0235418 A1 9/2008 Werthen et al.
2008/0253766 A1 10/2008 Yu et al.
2008/0265799 A1 10/2008 Sibert
2008/0296589 A1 12/2008 Speier et al.
2008/0297070 A1 12/2008 Kuenzler et al.
2008/0304833 A1 12/2008 Zheng
2008/0309255 A1 12/2008 Myers et al.
2008/0317475 A1 12/2008 Pederson et al.
2009/0026978 A1 1/2009 Robinson
2009/0040154 A1 2/2009 Scheibe
2009/0049295 A1 2/2009 Erickson et al.
2009/0051496 A1 2/2009 Pahlavan et al.
2009/0121238 A1 5/2009 Peck
2009/0171571 A1 7/2009 Son et al.
2009/0174331 A1 7/2009 Tanaka
2009/0196282 A1 8/2009 Fellman et al.
2009/0245101 A1 10/2009 Kwon et al.
2009/0278789 A1 11/2009 Declercq et al.
2009/0284511 A1 11/2009 Takasugi et al.
2009/0303972 A1 12/2009 Flammer, III et al.
2010/0005533 A1 1/2010 Shamir
2010/0054748 A1 3/2010 Sato
2010/0061734 A1 3/2010 Knapp
2010/0096447 A1 4/2010 Kwon et al.
2010/0134021 A1 6/2010 Ayres
2010/0134024 A1 6/2010 Brandes
2010/0141159 A1 6/2010 Shiu et al.
2010/0182294 A1 7/2010 Roshan et al.
2010/0188443 A1 7/2010 Lewis et al.
2010/0188972 A1 7/2010 Knapp
2010/0194299 A1 8/2010 Ye et al.
2010/0213856 A1 8/2010 Mizusako
2010/0272437 A1 10/2010 Yoon et al.
2010/0301777 A1 12/2010 Kraemer
2010/0327764 A1 12/2010 Knapp
2011/0031894 A1 2/2011 Van De Ven
2011/0044343 A1 2/2011 Sethuram et al.
2011/0052214 A1 3/2011 Shimada et al.
2011/0062874 A1 3/2011 Knapp
2011/0063214 A1 3/2011 Knapp
2011/0063268 A1 3/2011 Knapp
2011/0068699 A1 3/2011 Knapp
2011/0069094 A1 3/2011 Knapp
2011/0069960 A1 3/2011 Knapp et al.
2011/0133654 A1 6/2011 McKenzie et al.
2011/0148315 A1 6/2011 Van Der Veen et al.
2011/0150028 A1 6/2011 Nguyen et al.
2011/0248640 A1 10/2011 Welten
2011/0253915 A1 10/2011 Knapp
2011/0299854 A1 12/2011 Jonsson et al.
2011/0309754 A1 12/2011 Ashdown et al.
2012/0056545 A1 3/2012 Radermacher et al.
2012/0153839 A1 6/2012 Farley et al.
2012/0229032 A1 9/2012 Van De Ven et al.
2012/0299481 A1 11/2012 Stevens
2012/0306370 A1 12/2012 Van De Ven et al.
2013/0016978 A1 1/2013 Son et al.
2013/0088522 A1 4/2013 Gettemy et al.
2013/0201690 A1 * 8/2013 Vissenberg et al. ..... E04B 9/34 362/296.07
2013/0257314 A1 10/2013 Alvord et al.

(56) References Cited

U.S. PATENT DOCUMENTS

| | | | |
|---|---|---|---|
| 2013/0293147 | A1 | 11/2013 | Rogers et al. |
| 2014/0028377 | A1 | 1/2014 | Rosik et al. |
| 2015/0022110 | A1 | 1/2015 | Sisto |

FOREIGN PATENT DOCUMENTS

| | | | |
|---|---|---|---|
| CN | 1573881 | | 2/2005 |
| CN | 1650673 | | 8/2005 |
| CN | 1849707 | | 10/2006 |
| CN | 101083866 | | 12/2007 |
| CN | 101150904 | | 3/2008 |
| CN | 101331798 | | 12/2008 |
| CN | 101458067 | | 6/2009 |
| DE | 102008016095 | A1 | 10/2009 |
| DE | 102008064397 | A1 | 6/2010 |
| EP | 0196347 | | 10/1986 |
| EP | 0456462 | | 11/1991 |
| EP | 2273851 | | 1/2011 |
| EP | 2426405 | A2 | 3/2012 |
| EP | 2573451 | A1 | 3/2013 |
| GB | 2307577 | | 5/1997 |
| JP | 06-302384 | | 10/1994 |
| JP | 08-201472 | | 8/1996 |
| JP | 11-025822 | | 1/1999 |
| JP | 2001-514432 | | 9/2001 |
| JP | 2004-325643 | | 11/2004 |
| JP | 2005-539247 | | 12/2005 |
| JP | 2006-260927 | | 9/2006 |
| JP | 2007-266974 | | 10/2007 |
| JP | 2007-267037 | | 10/2007 |
| JP | 2008-507150 | | 3/2008 |
| JP | 2008-300152 | | 12/2008 |
| JP | 2009-134877 | | 6/2009 |
| WO | 00/37904 | | 6/2000 |
| WO | 03/075617 | | 9/2003 |
| WO | 2005/024898 | | 3/2005 |
| WO | 2006033031 | A2 | 3/2006 |
| WO | 2007/069149 | | 6/2007 |
| WO | 2008/065607 | | 6/2008 |
| WO | 2008/129453 | | 10/2008 |
| WO | 2010/124315 | | 11/2010 |
| WO | 2012/005771 | | 1/2012 |
| WO | 2012/042429 | | 4/2012 |
| WO | 2013/142437 | | 9/2013 |

OTHER PUBLICATIONS

International Search Report & Written Opinion, PCT/US2010/002171, dated Nov. 24, 2010.
International Search Report & Written Opinion, PCT/US2010/004953, dated Mar. 22, 2010.
International Search Report & Written Opinion, PCT/US2010/001919, dated Feb. 24, 2011.
U.S. Appl. No. 12/924,628, filed Sep. 30, 2010.
Office Action dated May 12, 2001 for U.S. Appl. No. 12/360,467.
Final Office Action dated Nov. 28, 2011 for U.S. Appl. No. 12/360,467.
Notice of Allowance dated Jan. 20, 2012 for U.S. Appl. No. 12/360,467.
Office Action dated Feb. 1, 2012 for U.S. Appl. No. 12/584,143.
Final Office Action dated Sep. 12, 2012 for U.S. Appl. No. 12/584,143.
Office Action dated Aug. 2, 2012 for U.S. Appl. No. 12/806,114.
Office Action dated Oct. 2, 2012 for U.S. Appl. No. 12/806,117.
Office Action dated Jul. 11, 2012 for U.S. Appl. No. 12/806,121.
Final Office Action dated Oct. 11, 2012 for U.S. Appl. No. 12/806,121.
Office Action dated Dec. 17, 2012 for U.S. Appl. No. 12/806,118.
Office Action dated Oct. 9, 2012 for U.S. Appl. No. 12/806,126.
Office Action dated Jul. 10, 2012 for U.S. Appl. No. 12/806,113.
Notice of Allowance dated Oct. 15, 2012 for U.S. Appl. No. 12/806,113.
International Search Report & Written Opinion dated Sep. 19, 2012 for PCT/US2012/045392.
Partial International Search Report dated Nov. 16, 2012 for PCT/US2012/052774.
Office Action dated Nov. 4, 2013 for CN Application No. 201080032373.7.
Office Action dated Dec. 4, 2013 for U.S. Appl. No. 12/803,805.
Notice of Allowance dated Jan. 28, 2014 for U.S. Appl. No. 13/178,686.
Notice of Allowance dated Feb. 21, 2014 for U.S. Appl. No. 12/806,118.
Office Action dated Apr. 22, 2014 for U.S. Appl. No. 12/806,114.
International Search Report & Written Opinion for PCT/US2012/052774 dated Feb. 4, 2013.
Notice of Allowance dated Feb. 4, 2013 for U.S. Appl. No. 12/809,113.
Notice of Allowance dated Feb. 25, 2013 for U.S. Appl. No. 12/806,121.
Notice of Allowance dated May 3, 2013 for U.S. Appl. No. 12/806,126.
International Search Report & Written Opinion, PCT/US2013/027157, dated May 16, 2013.
Office Action dated Jun. 10, 2013 for U.S. Appl. No. 12/924,628.
Office Action dated Jun. 27, 2013 for U.S. Appl. No. 13/178,686.
Final Office Action dated Jul. 9, 2013 for U.S. Appl. No. 12/806,118.
Final Office Action dated Jun. 14, 2013 for U.S. Appl. No. 12/806,117.
Johnson, "Visibile Light Communications," CTC Tech Brief, Nov. 2009, 2 pages.
Chonko, "Use Forward Voltage Drop to Measure Junction Temperature," © 2013 Penton Media, Inc., 5 pages.
Office Action dated Oct. 24, 2013 for U.S. Appl. No. 12/806,117.
Notice of Allowance dated Oct. 31, 2013 for U.S. Appl. No. 12/924,628.
Office Action dated Nov. 12, 2013 for U.S. Appl. No. 13/231,077.
Final Office Action dated Jun. 18, 2014 for U.S. Appl. No. 13/231,077.
Notice of Allowance dated Aug. 21, 2014 for U.S. Appl. No. 12/584,143.
Office Action dated Jun. 23, 2014 for U.S. Appl. No. 12/806,117.
Office Action dated Sep. 10, 2014 for U.S. Appl. No. 12/803,805.
Office Action dated Jan. 28, 2015 for U.S. Appl. No. 12/806,117.
Office Action dated Feb. 2, 2015 for CN Application 201080035731.
Office Action dated Jul. 1, 2014 for JP Application 2012-520587.
Office Action dated Feb. 17, 2015 for JP Application 2012-520587.
Office Action dated Mar. 11, 2014 for JP Application 2012-523605.
Office Action dated Sep. 24, 2014 for JP Application 2012-523605.
Office Action dated Mar. 25, 2015 for U.S. Appl. No. 14/305,472.
Notice of Allowance dated Mar. 30, 2015 for U.S. Appl. No. 14/097,355.
Office Action dated Apr. 8, 2015 for U.S. Appl. No. 14/305,456.
Notice of Allowance dated May 22, 2015 for U.S. Appl. No. 14/510,212.
Office Action dated May 27, 2015 for U.S. Appl. No. 12/806,117.
Partial International Search Report dated Mar. 27, 2015 for PCT/US2014/068556.
International Search Report & Written Opinion for PCT/US2014/068556 dated Jun. 22, 2015.
Final Office Action for U.S. Appl. No. 12/803,805 dated Jun. 23, 2015.
Office Action for U.S. Appl. No. 13/970,964 dated Jun. 29, 2015.
Office Action for U.S. Appl. No. 14/510,243 dated Jul. 28, 2015.
Office Action for U.S. Appl. No. 14/510,283 dated Jul. 29, 2015.
Office Action for U.S. Appl. No. 14/510,266 dated Jul. 31, 2015.
Office Action for U.S. Appl. No. 13/970,990 dated Aug. 20, 2015.
Partial International Search Report for PCT/US2015/037660 dated Aug. 21, 2015.
Final Office Action for U.S. Appl. No. 13/773,322 dated Sep. 2, 2015.
Notice of Allowance for U.S. Appl. No. 13/970,944 dated Sep. 11, 2015.
Notice of Allowance for U.S. Appl. No. 14/604,886 dated Sep. 25, 2015.
Notice of Allowance for U.S. Appl. No. 14/604,881 dated Oct. 9, 2015.

(56) References Cited

OTHER PUBLICATIONS

International Search Report & Written Opinion for PCT/US2015/037660 dated Oct. 28, 2015.
Office Action for U.S. Appl. No. 14/573,207 dated Nov. 4, 2015.
Notice of Allowance for U.S. Appl. No. 14/510,243 dated Nov. 6, 2015.
Notice of Allowance for U.S. Appl. No. 12/806,117 dated Nov. 18, 2015.
Partial International Search Report for PCT/US2015/045252 dated Nov. 18, 2015.
Office Action dated Mar. 6, 2015 for U.S. Appl. No. 13/733,322.
Extended European Search Report for EP Application EP Application 21152323.8, dated Jul. 26, 2021, 8 pages.
Office Action for U.S. Appl. No. 13/970,990 mailed Aug. 20, 2015.
Partial International Search Report for PCT/US2015/037660 mailed Aug. 21, 2015.
Final Office Action for U.S. Appl. No. 13/773,322 mailed Sep. 2, 2015.
Notice of Allowance for U.S. Appl. No. 13/970,944 mailed Sep. 11, 2015.
Notice of Allowance for U.S. Appl. No. 14/604,886 mailed Sep. 25, 2015.
Notice of Allowance for U.S. Appl. No. 14/604,881 mailed Oct. 9, 2015.
Office Action mailed Mar. 11, 2014 for JP Application 2012-523605.
Office Action mailed Sep. 24, 2014 for JP Application 2012-523605.
Office Action mailed Mar. 25, 2015 for U.S. Appl. No. 14/305,472.
Notice of Allowance mailed Mar. 30, 2015 for U.S. Appl. No. 14/097,355.
Office Action mailed Apr. 8, 2015 for U.S. Appl. No. 14/305,456.
Notice of Allowance mailed May 22, 2015 for U.S. Appl. No. 14/510,212.
Office Action mailed May 27, 2015 for U.S. Appl. No. 12/806,117.
Partial International Search Report mailed Mar. 27, 2015 for PCT/US2014/068556.
Office Action mailed Apr. 22, 2014 for U.S. Appl. No. 12/806,114.
Final Office Action mailed Jun. 18, 2014 for U.S. Appl. No. 13/231,077.
Office Action mailed Jun. 23, 2014 for U.S. Appl. No. 12/806,117.
"LED Fundamentals, How to Read a Datasheet (Part 2 of 2) Characteristic Curves, Dimensions and Packaging," Aug. 19, 2011, OSRAM Opto Semiconductors, 17 pages.
International Search Report & Written Opinion for PCT/US2014/068556 mailed Jun. 22, 2015.
Final Office Action for U.S. Appl. No. 12/803,805 mailed Jun. 23, 2015.
Office Action for U.S. Appl. No. 13/970,964 mailed Jun. 29, 2015.
Office Action for U.S. Appl. No. 14/510,243 mailed Jul. 28, 2015.
Office Action for U.S. Appl. No. 14/510,283 mailed Jul. 29, 2015.
Office Action for U.S. Appl. No. 14/510,266 mailed Jul. 31, 2015.
Notice of Allowance mailed Aug. 21, 2014 for U.S. Appl. No. 12/584,143.
Office Action mailed Sep. 10, 2014 for U.S. Appl. No. 12/803,805.
"Color Management of a Red, Green, and Blue LED Combinational Light Source," Avago Technologies, Mar. 2010, pp. 1-8.
Final Office Action mailed Jan. 28, 2015 for U.S. Appl. No. 12/806,117.
Office Action mailed Mar. 6, 2015 for U.S. Appl. No. 13/773,322.
Office Action mailed Feb. 2, 2015 for CN Application 201080035731.X.
Office Action mailed Jul. 1, 2014 for JP Application 2012-520587.
Office Action mailed Feb. 17, 2015 for JP Application 2012-520587.
Hall et al., "Jet Engine Control Using Ethernet with a BRAIN (Postprint)," AIAA/ASME/SAE/ASEE Joint Propulsion Conference and Exhibition, Jul. 2008, pp. 1-18.
Kebemou, "A Partitioning-Centric Approach for the Modeling and the Methodical Design of Automotive Embedded System Architectures," Dissertation of Technical University of Berlin, 2008, 176 pages.
O'Brien et al., "Visible Light Communications and Other Developments in Optical Wireless," Wireless World Research Forum, 2006, 26 pages.
Zalewski et al., "Safety Issues in Avionics and Automotive Databuses," IFAC World Congress, Jul. 2005, 6 pages.
"Visible Light Communication: Tutorial," Project IEEE P802.15 Working Group for Wireless Personal Area Networks (WPANs), Mar. 2008.
Johnson, "Visible Light Communications," CTC Tech Brief, Nov. 2009, 2 pages.
Chonko, "Use Forward Voltage Drop to Measure Junction Temperature," Dec. 2005, (c) 2013 Penton Media, Inc., 5 pages.
International Search Report & Written Opinion, PCT/US2010/000219, mailed Oct. 12, 2010.
Notice of Allowance mailed Feb. 4, 2013 for U.S. Appl. No. 12/806,113.
Final Office Action mailed Jun. 14, 2013 for U.S. Appl. No. 12/806,117.
Office Action mailed Dec. 4, 2013 for U.S. Appl. No. 12/803,805.
Office Action mailed Nov. 4, 2013 for CN Application No. 201080032373.7.
Notice of Allowance mailed Jan. 28, 2014 for U.S. Appl. No. 13/178,686.
Notice of Allowance mailed Feb. 21, 2014 for U.S. Appl. No. 12/806,118.
Bouchet et al., "Visible-light communication system enabling 73 Mb/s data streaming," IEEE Globecom Workshop on Optical Wireless Communications, 2010, pp. 1042-1046.
International Search Report & Written Opinion for PCT/U52015/037660 mailed Oct. 28, 2015.
Office Action for U.S. Appl. No. 14/573,207 mailed Nov. 4, 2015.
Notice of Allowance for U.S. Appl. No. 14/510,243 mailed Nov. 6, 2015.
Notice of Allowance for U.S. Appl. No. 12/806,117 mailed Nov. 18, 2015.
Partial International Search Report for PCT/US2015/045252 mailed Nov. 18, 2015.

* cited by examiner

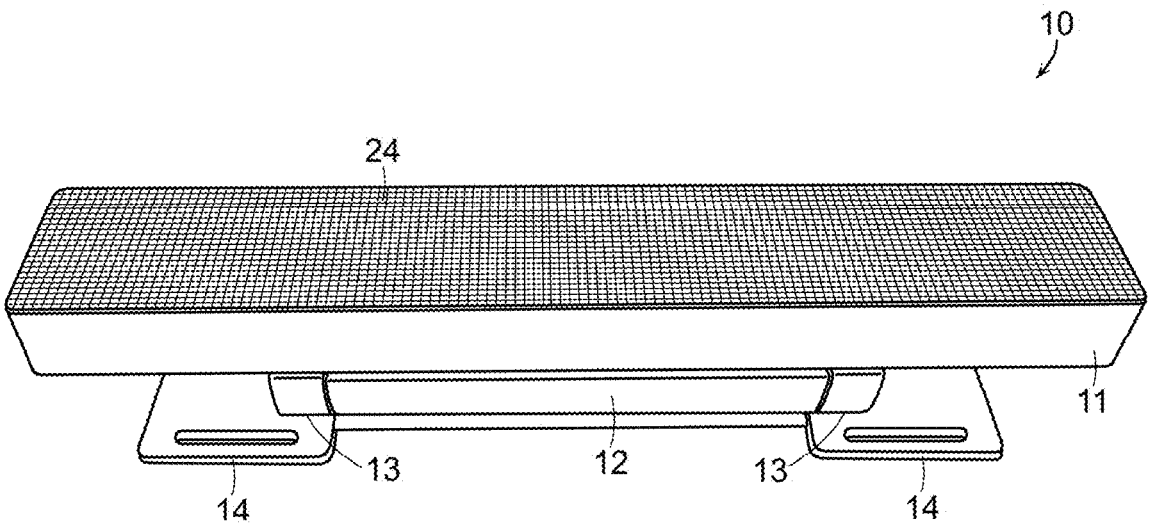
FIG. 1
Amended
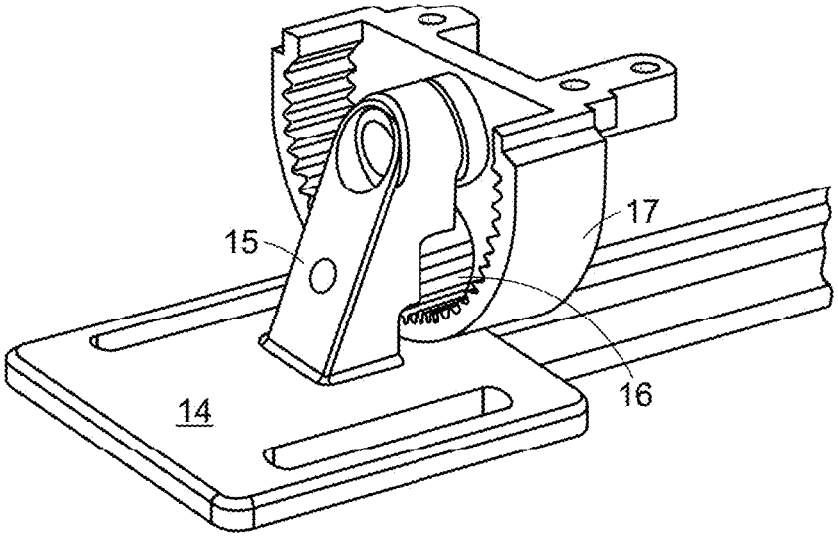
FIG. 2
Amended

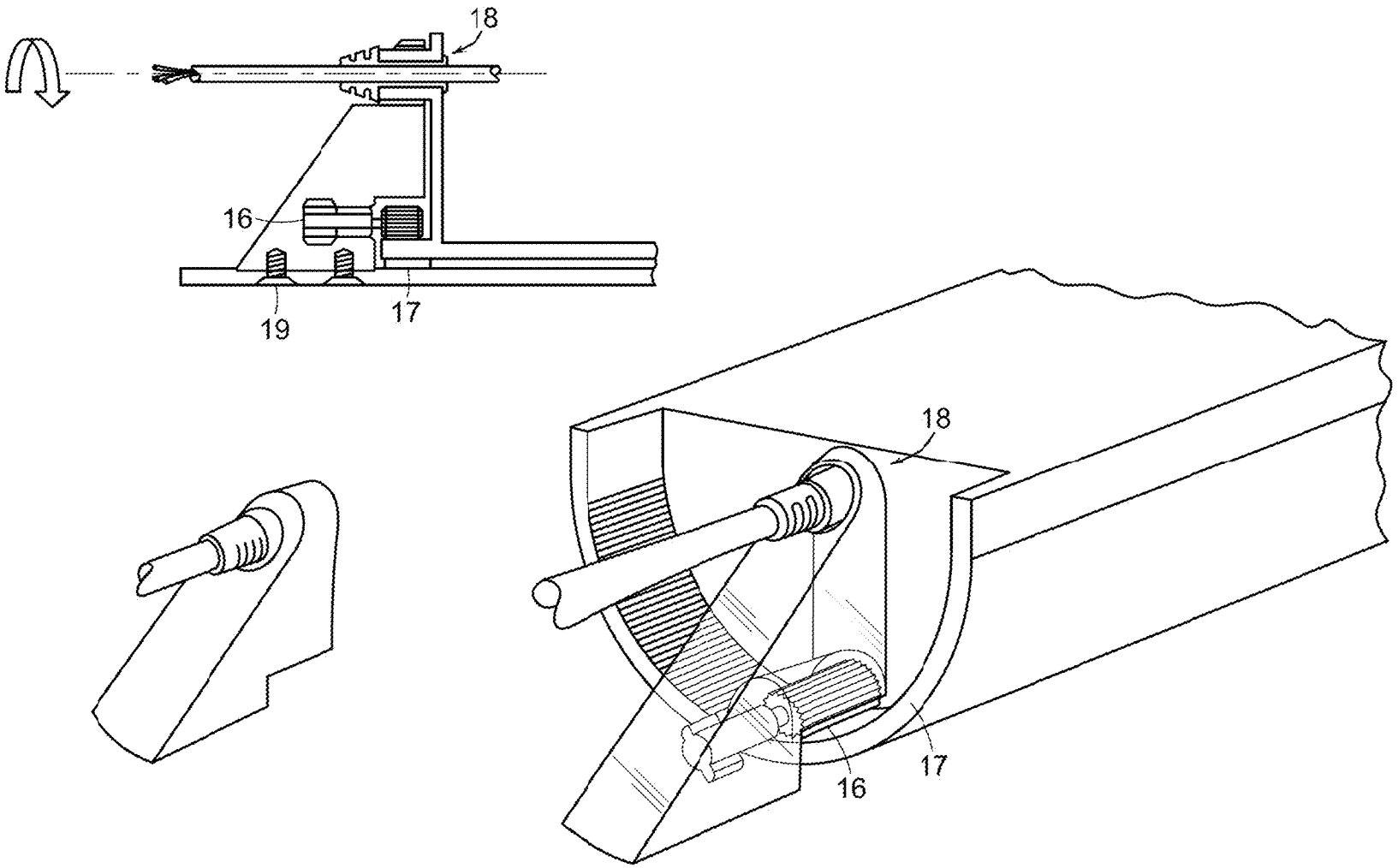
FIG. 3
Amended

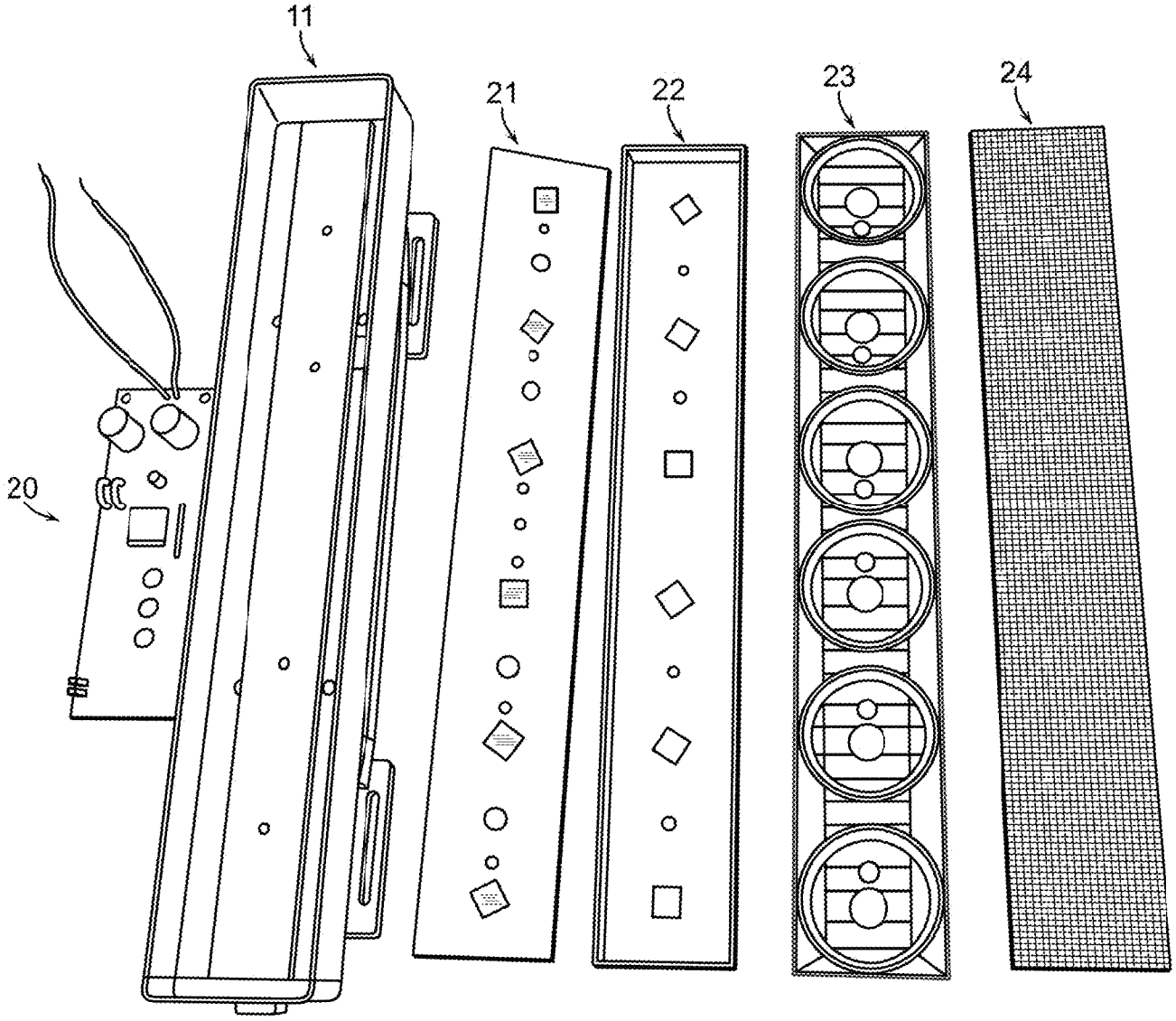
FIG. 4
Amended

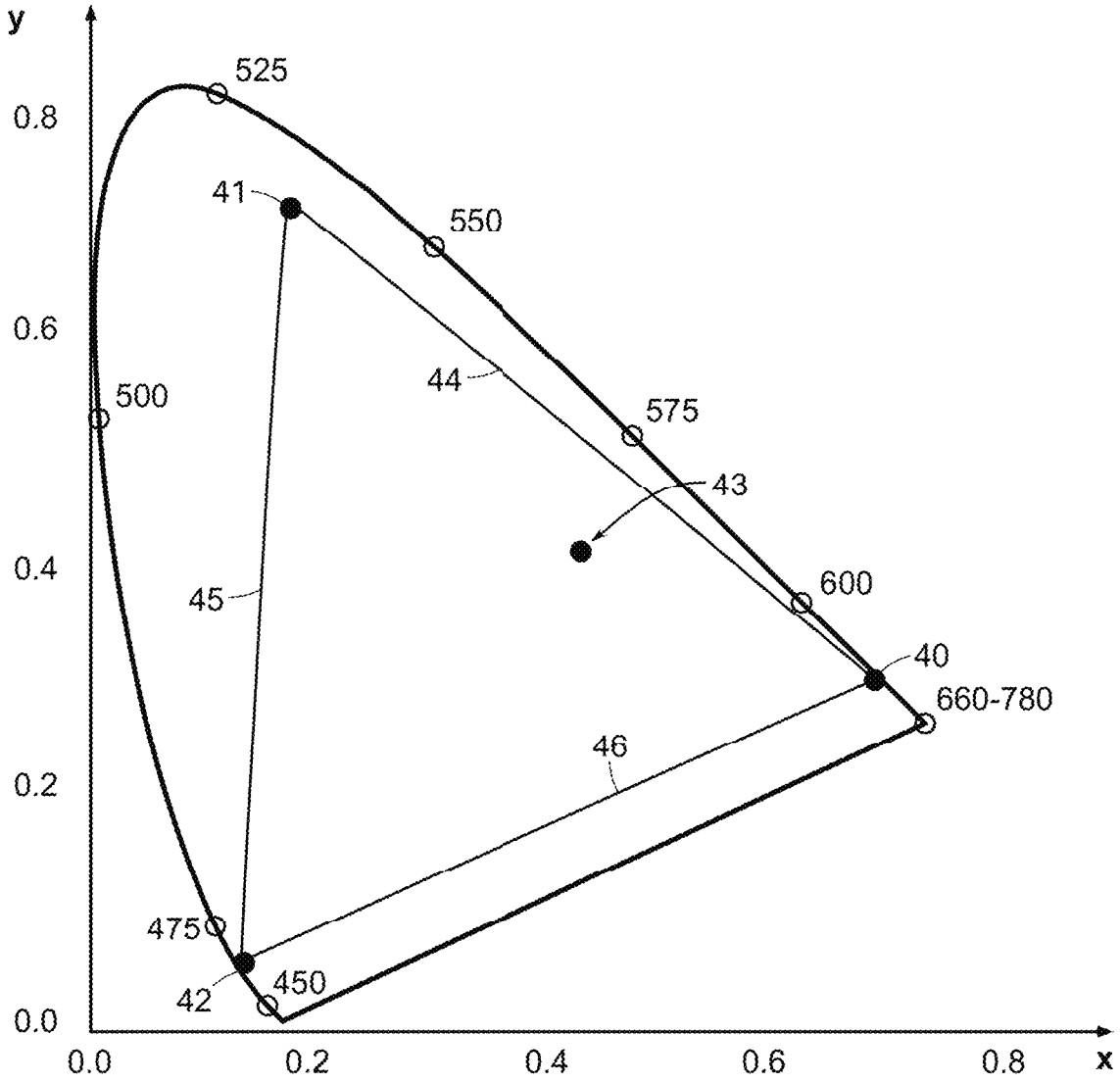
FIG. 7
Amended

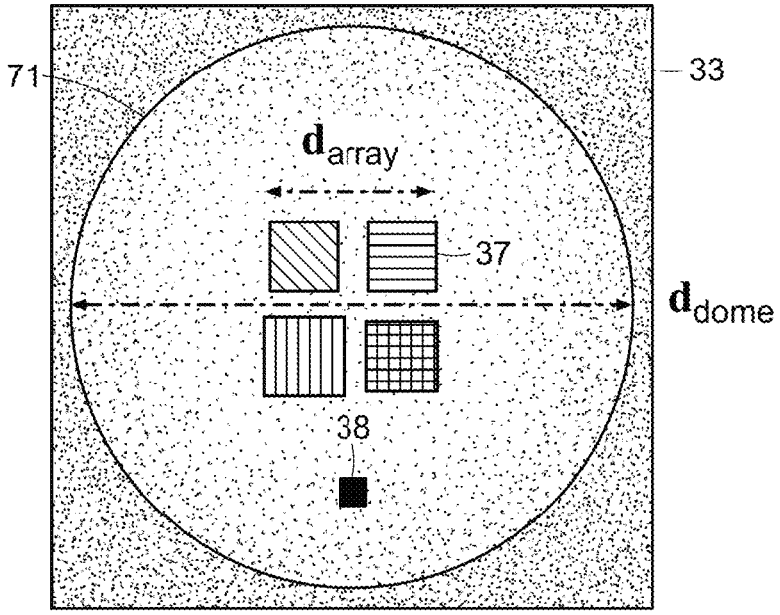
FIG. 10A
Amended
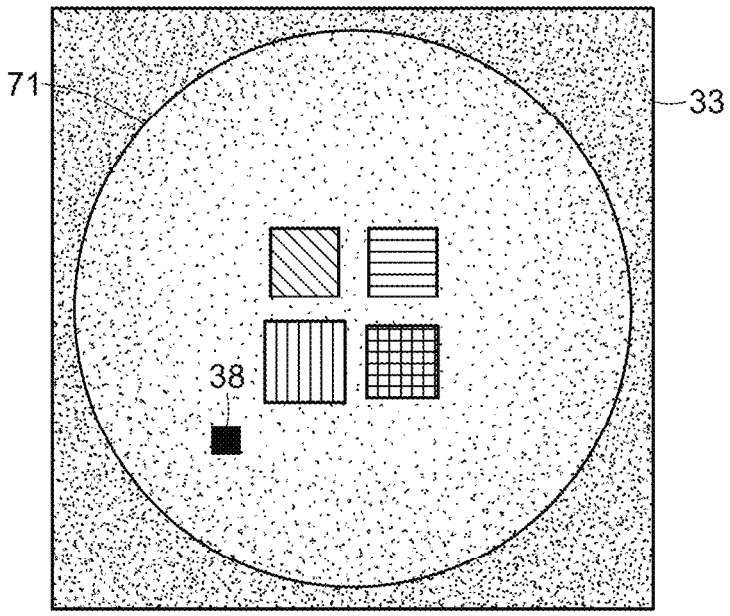
FIG. 10B
Amended

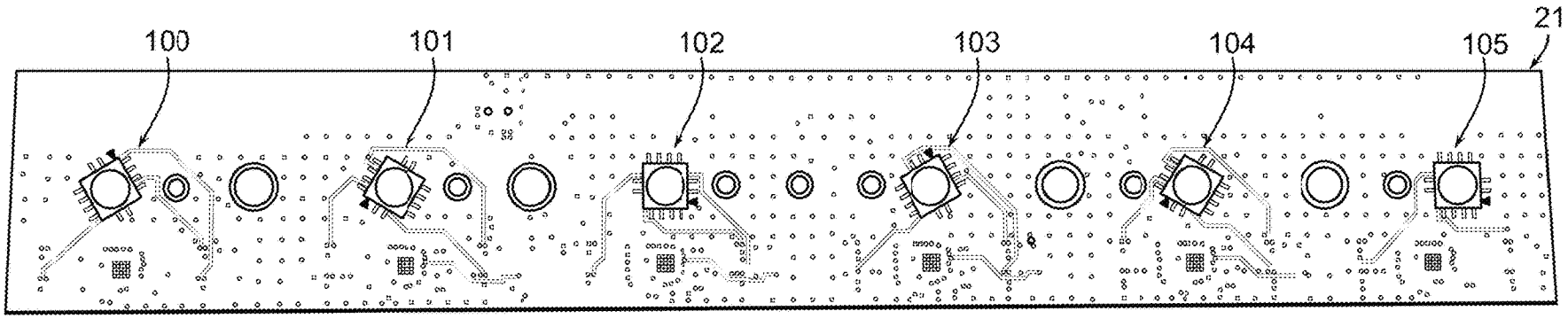
FIG. 11
Amended
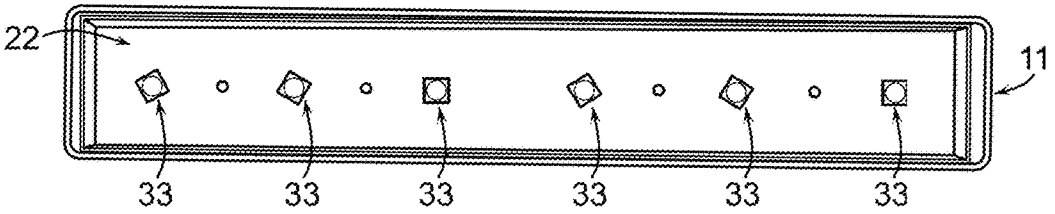
FIG. 12
Amended

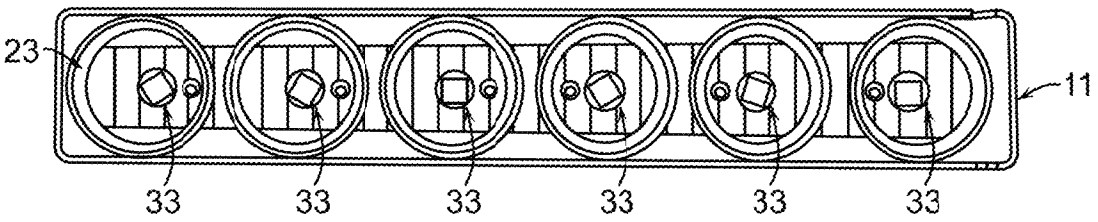
FIG. 13
Amended
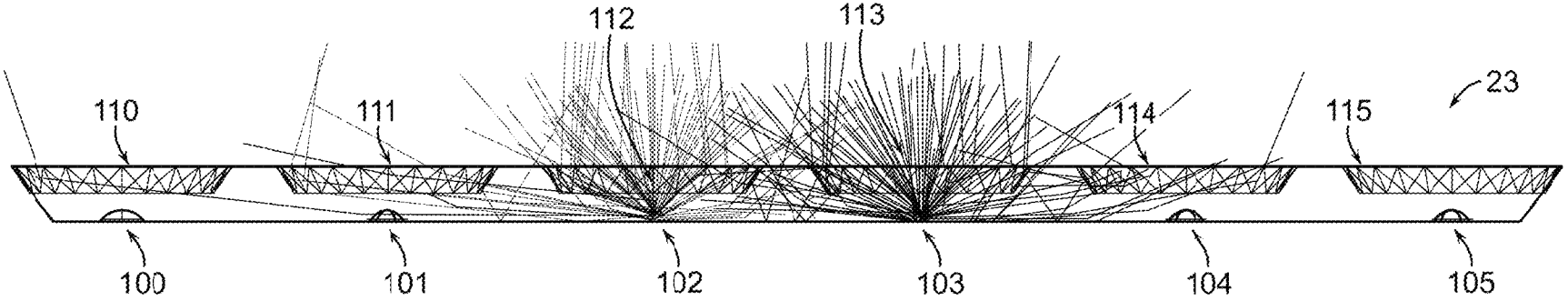
FIG. 14
Amended

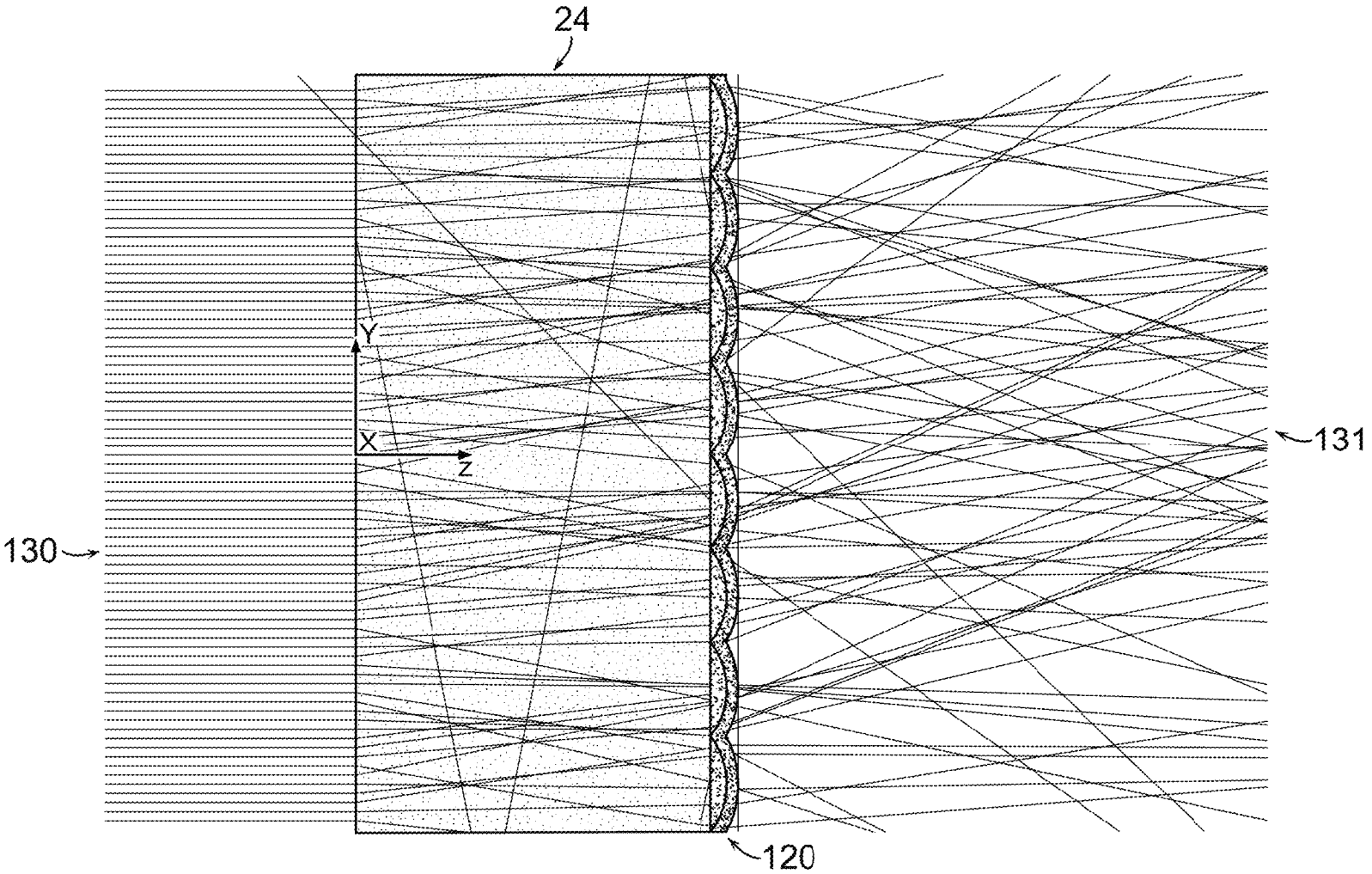
FIG. 17
Amended

LINEAR LED ILLUMINATION DEVICE WITH IMPROVED COLOR MIXING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a reissue of U.S. Pat. No. 9,360,174, issued on Jun. 7, 2016 from U.S. application Ser. No. 14/097,339, filed Dec. 5, 2013, which is hereby incorporated by reference herein in its entirety.*

RELATED APPLICATIONS

This application is related to the following applications: U.S. patent application Ser. No. 14/097,355, now U.S. Pat. No. 9,146,028; U.S. patent application Ser. Nos. 13/970,944; now issued as U.S. Pat. No. 9,237,620; 13/970,964; 13/970,990; 12/803,805; and 12/806,118 now issued as U.S. Pat. No. 8,772,336; each of which is hereby incorporated by reference in its entirety.

BACKGROUND

1. Field of the Invention

The invention relates to the addition of color mixing optics and optical feedback to produce uniform color throughout the output light beam of a multi-color linear LED illumination device.

2. Description of Related Art

Multi-color linear LED illumination devices (also referred to herein as lights, luminaires or lamps) have been commercially available for many years. Typical applications for linear LED illumination devices include wall washing in which a chain of lights attempt to uniformly illuminate a large portion of a wall, and cove lighting in which a chain of lights typically illuminates a large portion of a ceiling Multi-color linear LED lights often comprise red, green, and blue LEDs, however, some products use some combination of red, green, blue, white, and amber LEDs.

A multi-color linear LED illumination device typically includes one or more high power LEDs, which are mounted on a substrate and covered by a hemispherical silicone dome in a conventional package. The light output from the LED package is typically lambertian, which means that the LED package emits light in all directions. In most cases, Total Internal Reflection (TIR) secondary optical elements are used to extract the light emitted from a conventional LED package and focus that light into a desired beam. In order to extract the maximum amount of light, the TIR optics must have a specific shape relative to the dome of the LED package. Other dimensions of the TIR optics determine the shape of the emitted light beam.

Some multi-color linear LED light products comprise individually packaged LEDs and individual TIR optics for each LED. In order for the light emitted from the different colored LED emitters to mix properly, the light beams from each individual color LED must overlap. However, because the LEDs are spaced centimeters apart, the beams will overlap and the colors will mix only in the far field, at some distance away from the linear light. At a very close range to the linear light, the beams will be separate and the different colors are clearly visible. Although such a product may exhibit good color mixing in the far field, it does not exhibit good color mixing in the near field.

Other multi-color linear LED light products use red, green, and blue LEDs packaged together with a single TIR optic attached to each RGB LED package. These RGB LED packages typically comprise an array of three or four LEDs, which are placed as close together as possible on a substrate and the entire array is covered by one hemispherical dome. In products that use one TIR optical element for each multi-color LED package, there is not necessarily a need for the beams from the different TIR optical elements to overlap for the colors to mix. Therefore, such products tend to have better near field color mixing than products that use individually packaged LEDs.

However, depending on the size of the primary and secondary optics, the far field color mixing may actually be worse in products that package multiple colors of LEDs together. Since the different colored LEDs are in physically different locations within the hemispherical silicone dome, the light radiated from the dome, and therefore, from the TIR optical element will not be perfectly mixed. Although larger domes and larger TIR optical elements may be used to provide better color mixing, there are practical limits to the size of these components, and consequently, to the near and far field color mixing provided by such an approach.

An alternative optical system, although not commonly used, for color mixing and beam shaping in multi-color LED linear lights uses reflectors. In some cases, the light from a plurality of multi-colored LED emitter packages are mixed by a diffusion element and shaped by a concave reflector that redirects the light beams down a wall. The diffusion element could be combined with an exit lens or could be a shell diffuser placed over the multi-color emitter packages, for instance. Alternatively, the system could use a shell diffuser and a diffused exit lens. Although such systems can achieve very good color mixing in both the near and the far field, there is a tradeoff between color mixing and optical efficiency. As the amount of diffusion increases, the color mixing improves, but the optical efficiency decreases as the diffuser absorbs and scatters more light.

As LEDs age, the light output at a given drive current changes. Over thousands of hours, the light output from any individual LED may decrease by approximately 10-25% or more. The amount of degradation varies with drive current, temperature, color, and random defect density. As such, the different colored LEDs in a multi-color LED light will age differently, which changes the color of the light produced by the illumination device over time. A high quality multi-color LED light that can maintain precise color points over time should have the means to measure the light output from each color component, and adjust the drive current to compensate for changes. Further, a multi-color linear light should have the means to measure the light produced by each set of colored LEDs independent from other sets to prevent part of the linear light from producing a different color than other parts.

Multi-color LED linear lights with TIR optics on each individual LED cannot achieve good color mixing in the near field. Multi-color LED linear lights that combine a multi-color LED package with a TIR optical element require a large TIR optical element to achieve good color mixing in the near and far fields. Multi-color LED linear lights that use conventional diffusers and reflectors to achieve good color mixing in both the near and the far field suffer optical losses.

As such, there is a need for an improved optical system for multi-color LED linear lights that provides good color mixing in the near and far fields, is not excessively large and expensive, and has good optical efficiency. Further, there is a need for an optical feedback system to maintain precise color in such linear lights. The invention described herein provides a solution.

SUMMARY OF THE INVENTION

A linear multi-color LED illumination device that produces a light beam with uniform color throughout the output beam without the use of excessively large optics or optical losses is disclosed herein. In addition to improved color mixing, the illumination device includes a light detector and optical feedback for maintaining precise and uniform color over time and/or with changes in temperature. The illumination device described herein may also be referred to as a light, luminaire or lamp.

Various embodiments are disclosed herein for improving color mixing in a linear multi-color LED illumination device. These embodiments include, but are not limited to, a uniquely configured dome encapsulating a plurality of emission LEDs and a light detector within an emitter module, a unique arrangement of the light detector relative to the emission LEDs within the dome, a unique arrangement of a plurality of such emitter modules in a linear light form factor, and reflectors that are specially designed to improve color mixing between the plurality of emitter modules. The embodiments disclosed herein may be utilized together or separately, and a variety of features and variations can be implemented, as desired, to achieve optimum color mixing results. In addition, related systems and methods can be utilized with the embodiments disclosed herein to provide additional advantages or features. Although the various embodiments disclosed herein are described as being implemented in a linear light form factor, certain features of the disclosed embodiments may be utilized in illumination devices having other form factors to improve the color mixing in those devices.

According to one embodiment, an illumination device is disclosed herein as including a plurality of LED emitter modules, which are spaced apart from each other and arranged in a line. Each emitter module may include a plurality of emission LEDs whose output beams combine to provide a wide color gamut and a wide range of precise white color temperatures along the black body curve. For example, each emitter module may include four different colors of emission LEDs, such as red, green, blue, and white LEDs. In such an example, the red, green, and blue emission LEDs may provide saturated colors, while a combination of light from the RGB LEDs and a phosphor converted white LED provide a range of whites and pastel colors. However, the emitter modules described herein are not limited to any particular number and/or color of emission LEDs, and may generally include a plurality of emission LEDs, which include at least two different colors of LEDs. The plurality of LEDs may be arranged in a two-dimensional array (e.g., a square array), mounted on a substrate (e.g., a ceramic substrate), and encapsulated within a dome.

In some embodiments, the linear illumination device may comprise six emitter modules per foot, and each emitter module may be rotated approximately 120 degrees relative to the next adjacent emitter module. The rotation of subsequent emitters in the line improves color mixing between adjacent emitter modules to some degree. Although such an arrangement has been shown to provide sufficient lumen output, efficacy, and color mixing, one skilled in the art would understand how the inventive concepts described herein can be applied to other combinations of LED numbers/colors per emitter module, alternative numbers of LED emitter modules per foot, and other angular rotations between emitter modules without departing from the scope of the invention.

In general, an illumination device in accordance with the present invention may include at least a first emitter module, a second emitter module, and a third emitter module arranged in a line, wherein the second emitter module is spaced equally distant between the first and third emitter modules. To improve color mixing, the second emitter module may be rotated X degrees relative to the first emitter module, and the third emitter module may be rotated 2X degrees relative to the first emitter module. X may be substantially any rotational angle equal to 360 degrees divided by an integer N, where N is greater than or equal to 3.

In some embodiments, color mixing may be further improved by covering each emitter module with an optically transmissive dome, whose shallow or flattened shape allows a significant amount of light emitted by the LED array to escape out of the side of the emitter module. For example, a shallow dome may be formed with a radius in a plane of the LED array that is about 20-30% larger than the radius of the curvature of the shallow dome. Such a shape may enable approximately 40% of the light emitted by the LED array to exit the shallow dome at small angles (e.g., approximately 0 to 30 degrees) relative to the plane of the LED array.

In some embodiments, color mixing may be further improved by the inclusion of a specially designed reflector, which is suspended above the plurality of emitter modules. The reflector comprises a plurality of louvers, each of which may be centered upon and suspended a spaced distance above a different one of the emitter modules. These louvers comprise a substantially circular shape with sloping sidewalls, which are angled so that a top diameter of the louver is substantially larger than a bottom diameter of the louver. The louvers are configured to focus a majority of the light emitted by the emitter modules into an output beam by configuring the bottom diameter of the louvers to be substantially larger than the diameter of the emitter modules. In some cases, the sloping sidewalls of the louvers may include a plurality of planar facets, which randomize the direction of light rays reflected from the planar facets.

By suspending the louvers a spaced distance above the emitter modules, the louvers allow the portion of the light that emanates sideways from adjacent emitter modules to mix underneath the louvers before that light is redirected out of the illumination device through an exit lens. In some embodiments, the louvers may be suspended approximately 5 mm to approximately 10 mm above the emitter modules. Other distances may be appropriate depending on the particular design of the emitter modules and the louvers.

In some embodiments, an exit lens may be provided with a combination of differently textured surfaces and/or patterns on opposing sides of the lens to further promote color mixing. For example, an internal surface of the exit lens may comprise a flat roughened surface that diffuses the light passing through the exit lens. An external surface of the exit lens may comprise an array of micro-lenses, or lenslets, to further scatter the light rays and shape the output beam.

In some embodiments, each emitter module may also comprise a detector, which is configured to detect light emitted by the emission LEDs. The detector is mounted onto the substrate and encapsulated within the shallow dome, along with the emission LEDs, and may be an orange, red or yellow LED, in one embodiment. Regardless of color, the detector LED is preferably placed so as to receive the greatest amount of reflected light from the emission LED having the shortest wavelength. For example, the emission LEDs may include red, green, blue and white LEDs arranged in a square array, in one embodiment. In this embodiment, the detector LED is least sensitive to the shortest wavelength emitter LED, i.e., the blue LED. For this reason, the detector LED is positioned on the side of the array that is furthest from the blue LED, so as to receive the greatest amount of light reflected off the dome from the blue LED. In some cases, the dome may have a diffuse or textured surface, which increases the amount of light that is reflected off the surface of the dome back towards the detector LED.

In addition to the emitter modules, the illumination device described herein includes a plurality of driver circuits coupled to the plurality of LEDs for supplying drive currents thereto. During a compensation period, the plurality of driver circuits are configured to supply drive currents to the plurality of emission LEDs, one LED at a time, so that the detector LED can detect the light emitted by each individual LED. A receiver is coupled to the detector LED for monitoring the light emitted by each individual LED and detected by the detector LED during the compensation period. In some embodiments, the receiver may comprise a trans-impedance amplifier that detects the amount of light produced by each individual LED. Control logic is coupled to the receiver and the driver circuits for controlling the drive currents produced by the driver circuits based on the amount of light detected from each LED. In some embodiments, the control logic may use optical and/or temperature measurements obtained from the emission LEDs to adjust the color and/or intensity of the light produced by the illumination device over time and/or with changes in temperature.

Various other patents and patent applications assigned to the assignee, including U.S. Publication No. 2010/0327764, describe means for periodically turning all but one emission LED off during the compensation period, so that the light produced by each emission LED can be individually measured. Other patent applications assigned to the assignee, including U.S. patent application Ser. Nos. 13/970,944; 13/970,964; and 13/970,990 describe means for measuring a temperature of the LEDs and adjusting the intensity of light emitted by the LEDs to compensate for changes in temperature. These commonly assigned patents and patent applications are incorporated by reference in their entirety. The invention described herein utilizes the assignee's earlier work and improves upon the optical measurements by placing the detector LED within the dome, and away from the shortest wavelength LED, to ensure the light for all emission LEDs is properly detected.

Any detector in a multi-color light source with optical feedback should be placed to minimize interference from external light sources. This invention places the detectors within the silicone dome to prevent interference from external sources and other emitter modules within the linear light. The detectors are preferably red, orange or yellow LEDs, but could comprise silicon diodes or any other type of light detector. However, red, orange or yellow detector LEDs are preferable over silicon diodes, since silicon diodes are sensitive to infrared as well as visible light, while LEDs are sensitive to only visible light.

In some embodiments, the illumination device may further include an emitter housing, a power supply housing coupled to the emitter housing and at least one mounting bracket for mounting the illumination device to a surface (e.g., a wall or ceiling) The emitter modules, the reflector and the driver circuits described above reside within the emitter housing. The exit lens is mounted above the reflector and attached to sidewalls of the emitter housing. In some embodiments, the power supply housing may be coupled to a bottom surface of the emitter housing and comprises an orifice through which a power cable may be routed and connected to a power converter housed within the power supply housing. In some embodiments, a special hinge mechanism may be coupled between the emitter housing and the at least one mounting bracket. As described in the commonly assigned co-pending U.S. application Ser. No. 14/097,335, the hinge mechanism allows the emitter housing to rotate approximately 180 degrees relative to the mounting bracket around a rotational axis of the hinge mechanism. The co-pending application is hereby incorporated in its entirety.

DESCRIPTION OF THE DRAWINGS

Other objects and advantages of the invention will become apparent upon reading the following detailed description and upon reference to the accompanying drawings.

FIG. 1 is a picture of an exemplary full color gamut linear LED light.

FIG. 2 is an exemplary illustration of the rotating hinges shown in FIG. 1.

FIG. 3 provides additional illustration of the rotating hinge components.

FIG. 4 is a picture of exemplary components that may be included within the full color gamut linear LED light of FIG. 1.

FIG. 7 is an illustration of an exemplary color gamut that may be produced by the linear LED light on a CIE1931 color chart.

FIG. 10A is a drawing of an exemplary LED emitter module depicting a desirable placement of the emission LEDs and the detector LED within the dome, according to one embodiment.

FIG. 10B is a drawing of an exemplary LED emitter module depicting another desirable placement of the emission LEDs and the detector LED within the dome, according to another embodiment.

FIG. 11 is a photograph of an exemplary emitter board comprising a plurality of LED emitter modules, wherein sets of the modules are rotated relative to each other to promote color mixing.

FIG. 12 is a photograph of an exemplary emitter board, emitter housing and reflector for a full color gamut linear LED light with a 120 degree beam angle.

FIG. 13 is a photograph of an exemplary emitter board, emitter housing and a reflector for a full color gamut linear LED light with a 60 degree beam angle.

FIG. 14 is an exemplary ray diagram illustrating how the shallow dome of the emitter modules and the reflector of FIG. 13 enable light rays from adjacent emitter modules to mix together to promote color mixing.

FIG. 17 is an exemplary ray diagram illustrating the effect that the exit lens shown in FIG. 16 has on the output beam when the plurality of lenslets formed on the external surface is combined with a textured internal surface.

Figure 5:
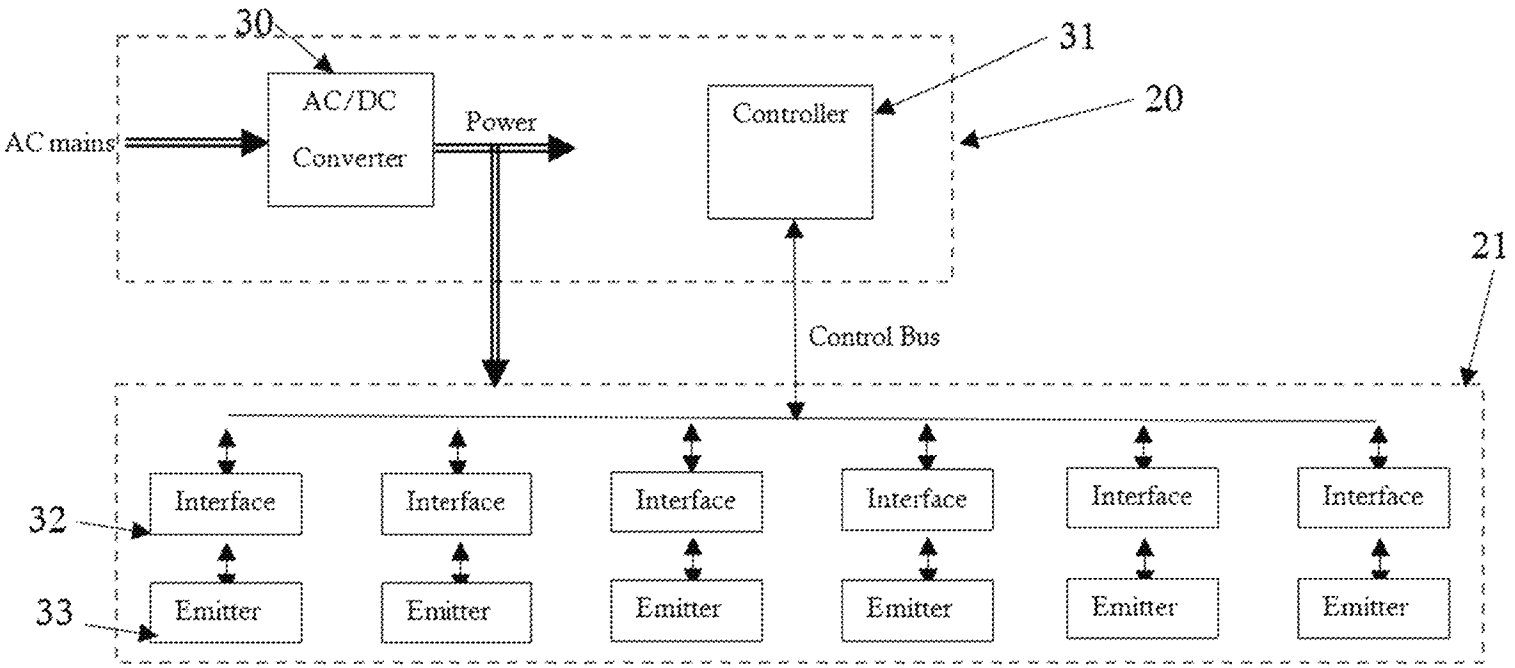
FIG. 5 is an exemplary block diagram of circuitry that may be included on the driver board and the emitter board of the exemplary full color gamut linear LED light of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a picture of a linear LED lamp 10, according to one embodiment of the invention. As described in more detail below, linear LED lamp 10 produces light over a wide color gamut, thoroughly mixes the color components within the output beam, and uses an optical feedback system to maintain precise color over LED lifetime, and in some cases, with changes in temperature. The linear LED lamp 10 shown in FIG. 1 is powered by the AC mains, but may be powered by alternative power sources without departing from the scope of the invention. The light beam produced by LED lamp 10 can be symmetric or asymmetric, and can have a variety of beam angles including, but not limited to, 120×120, 60×60, and 60×30. If an asymmetric beam is desired, the asymmetric beam typically has a wider beam angle across the length of the lamp.

In general, LED lamp 10 comprises emitter housing 11, power supply housing 12, and rotating hinges 13. As shown more clearly in FIG. 4, and discussed below, emitter housing 11 comprises a plurality of LED driver circuits, a plurality of LED emitter modules and a reflector, which is mounted a spaced distance above the emitter modules for focusing the light emitted by the emitter modules. The power supply housing 12 comprises an AC/DC converter powered by the AC mains, in one embodiment. Rotating hinges 13 allow both emitter housing 11 and power supply housing 12 to rotate 180 degrees relative to a pair of mounting brackets 14, which provides installation flexibility. Although a pair of mounting brackets 14 are shown in FIG. 1, alternative embodiments of the LED lamp may include a greater or lesser number of brackets, as desired.

In linear lighting fixtures, such as LED lamp 10, one major design requirement is to have the power cable enter and exit through the axis of rotation. This requirement allows adjacent lighting fixtures to be independently adjusted, while maintaining a constant distance between connection points of adjacent lighting fixtures. However, this requirement complicates the design of the rotational hinges used in linear lighting, as it prevents the hinges from both rotating and passing power through the same central axis. LED lamp 10 solves this problem by moving the rotational components of the hinge off-axis, and joining the rotational components to the central axis with a swing arm to a rack and pinion gear assembly. An embodiment of such a solution is shown in FIGS. 2-3 and described below.

As shown in FIG. 2, each rotating hinge 13 may include a swing arm 15, an end cap 17 and a hinge element 16. The end cap 17 may be configured with a flat upper surface for attachment to the emitter housing 11 and a semi-circular inner surface comprising a plurality of teeth. One end of the swing arm 15 is securely mounted onto the mounting bracket 14 of the linear LED lamp 10. In some embodiments, the swing arm 15 can be secured to the mounting bracket 14 by way of screws 19, as shown in FIG. 3. However, alternative means of attachment may be used in other embodiments of the invention. An opposite end of the swing arm 15 is coupled near the flat upper surface of the end cap 17 and is centered about the rotational axis of the hinge mechanism. The opposite end of the swing arm comprises a cable exit gland 18, which is aligned with the orifice of the power supply housing for routing the power cable into the power supply housing at the rotational axis of the hinge mechanism.

As shown in FIGS. 2 and 3, swing arm 15 houses a hinge element 16 that provides an amount of resistance needed to secure the lamp 10 in substantially any rotational position within a 180 degree range of motion. The hinge element 16 extends outward from within the swing arm 15 and generally comprises a position holding gear, which is configured to interface with the toothed end cap 17 of the linear LED lamp 10. In some embodiments, the hinge element 16 may further comprise a constant torque element that provides a substantially consistent amount of torque to the position holding gear, regardless of whether the position holding gear is stationary or in motion. In other embodiments, the constant torque element may be replaced with a high static energy/low kinetic energy rotational element to enable easier rotational adjustment, while still providing the necessary resistance to hold the lamp 10 in the desired rotational position.

The rotating hinge 13 shown in FIGS. 2-3 enables electrical wiring (e.g., a power cable) to be routed through the rotational axis of the rotating hinge 13 and to enter/exit the hinge at the cable exit gland 18. In some embodiments, a strain relief member (e.g., a nylon bushing) may be provided at the cable exit gland 18 to reduce the amount of strain applied to the electrical wiring in response to rotational movement about the rotational axis.

Unlike conventional lighting devices, the present invention provides both power and rotation through the same axis by positioning the rotational components of the hinge 13 (i.e., the hinge element 16 and end cap 17) away from the rotational axis of the hinge mechanism. This is achieved, in one embodiment, by positioning the position holding gear of the hinge element 16 so that it travels around the semi-circular inner surface of the end cap 17 in an arc, whose radius is a fixed distance (d) away from the rotational axis of the hinge 13.

FIG. 4 is a photograph of various components that may be included within LED lamp 10, such as a power supply board 20, emitter housing 11, emitter board 21, 120×120 degree reflector 22, 60×60 degree reflector 23, and exit lens 24. Although two reflectors are shown in the photograph of FIG. 4, the assembled LED lamp 10 would include either the 120×120 degree reflector 22 or the 60×60 degree reflector 23, but not both. Power supply board 20 connects the LED lamp 10 to the AC mains (not shown) and resides in power supply housing 12 (shown in FIG. 1). Power supply board 20 provides DC power and control to emitter board 21, which comprises the emitter modules and driver circuits. Emitter board 21 resides inside emitter housing 11 and is covered by either reflector 22 or reflector 23. The exit lens 24 is mounted above the reflector 22/23 and attached to the sidewalls of the emitter housing 11. As shown in FIG. 1, the exit lens 24 is configured such that the external surface of the lens is substantially flush with the top of the sidewalls of the emitter housing. As described in more detail below, exit lens 24 may comprise an array of small lenses (or lenslets) on the external surface of the exit lens to improve color mixing and beam shape.

FIGS. 1 and 4 illustrate one possible set of components for a linear LED lamp 10, in accordance with the present invention. Other embodiments of linear LED lights could have substantially different components and/or dimensions for different applications. For instance, if LED lamp 10 was used for outdoor wall washing, the mechanics, optics and dimensions could be significantly different than those shown in FIGS. 1 and 4. As such FIGS. 1 and 4 provide just one example of a linear LED lamp.

FIG. 5 is an exemplary block diagram for the circuitry included on power supply board 20 and emitter board 21. Power supply board 20 comprises AC/DC converter 30 and controller 31. AC/DC converter 30 converters AC mains power to a DC voltage of typically 15-20V, which is then used to power controller 31 and emitter board 21. Each such block may further regulate the DC voltage from AC/DC converter 30 to lower voltages as well. Controller 31 communicates with emitter board 21 through a digital control bus, in this example. Controller 31 could comprise a wireless, powerline, or any other type of communication interface to enable the color of LED lamp 10 to be adjusted. In the illustrated embodiment, emitter board 21 comprises six emitter modules 33 and six interface circuits 32. Interface circuits 32 communicate with controller 31 over the digital control bus and produce the drive currents supplied to the LEDs within the emitter modules 33.

Figure 6:
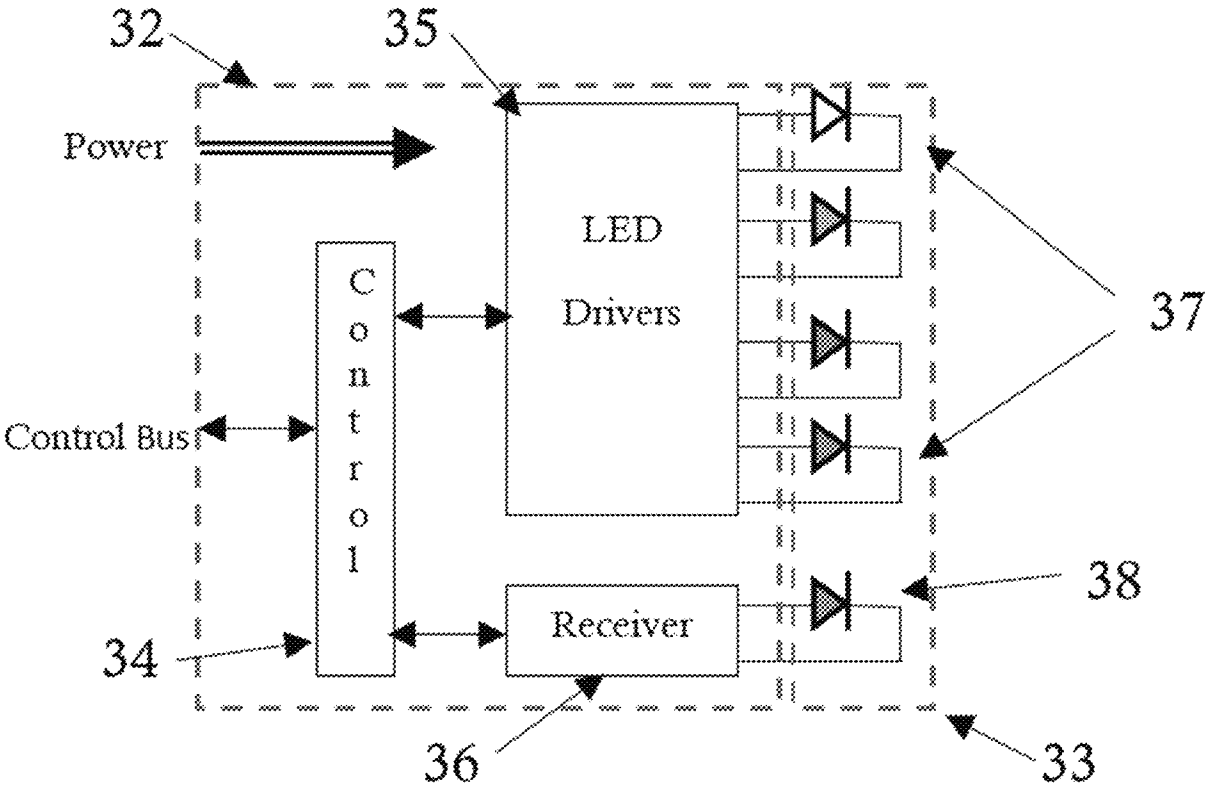
FIG. 6 is an exemplary block diagram of the interface circuitry and emitter module of FIG. 5.

FIG. 6 illustrates exemplary circuitry that may be included within interface circuitry 32 and emitter modules 33. Interface circuitry 32 comprises control logic 34, LED drivers 35, and receiver 36. Emitter module 33 comprises emission LEDs 37 and a detector 38. Control logic 34 may comprise a microcontroller or special logic, and communicates with controller 31 over the digital control bus. Control logic 34 also sets the drive current produced by LED drivers 35 to adjust the color and/or intensity of the light produced by emission LEDs 37, and manages receiver 36 to monitor the light produced by each individual LED 37 via detector 38. In some embodiments, control logic 34 may comprise memory for storing calibration information necessary for maintaining precise color, or alternatively, such information could be stored in controller 31.

According to one embodiment, LED drivers 35 may comprise step down DC to DC converters that provide substantially constant current to the emission LEDs 37. Emission LEDs 37, in this example, may comprise white, blue, green, and red LEDs, but could include substantially any other combination of colors. LED drivers 35 typically supply different currents (levels or duty cycles) to each emission LED 37 to produce the desired overall color output from LED lamp 10. In some embodiments, LED drivers 35 may measure the temperature of the emission LEDs 37 through mechanisms described, e.g., in pending U.S. patent application Ser. Nos. 13/970,944; 13/970,964; 13/970,990; and may periodically turn off all LEDs but one to perform optical measurements during a compensation period. The optical and temperature measurements obtained from the emission LEDs 37 may then be used to adjust the color and/or intensity of the light produced by the linear LED lamp 10 over time and with changes in temperature.

FIG. 7 is an illustration of an exemplary color gamut produced with the red, green, blue, and white emission LEDs 37 included within linear LED lamp 10. Points 40, 41, 42, and 43 represent the color produced by the red, green, blue, and white LEDs 37 individually. The lines 44, 45, and 46 represent the boundaries of the colors that this example LED lamp 10 could produce. All colors within the triangle formed by 44, 45, and 46 can be produced by LED lamp 10.

FIG. 7 is just one example of a possible color gamut that can be produced with a particular combination of multi-colored LEDs. Alternative color gamuts can be produced with different LED color combinations. For instance, the green LED within LEDs 37 could be replaced with another phosphor converted LED to produce a higher lumen output over a smaller color gamut. Such phosphor converted LEDs could have a chromaticity in the range of (0.4, 0.5) which is commonly used in white plus red LED lamps. Additionally, cyan or yellow LEDs could be added to expand the color gamut. As such, FIG. 7 illustrates just one exemplary color gamut that could be produced with LED lamp 10.

Detector 38 may be any device, such as a silicon photodiode or an LED, that produces current indicative of incident light. In at least one embodiment, however, detector 38 is preferably an LED with a peak emission wavelength in the range of approximately 550 nm to 700 nm. A detector 38 with such a peak emission wavelength will not produce photocurrent in response to infrared light, which reduces interference from ambient light. In at least one preferred embodiment, detector 38 may comprise a small red, orange or yellow LED.

Referring back to FIG. 6, detector 38 is connected to a receiver 36. Receiver 36 may comprise a trans-impedance amplifier that converts photocurrent to a voltage that may be digitized by an ADC and used by control logic 34 to adjust the drive currents, which are supplied to the emission LEDs 37 by the LED drivers 35. In some embodiments, receiver 36 may further be used to measure the temperature of detector 38 through mechanisms described, e.g., in pending U.S. patent application Ser. Nos. 13/970,944, 13/970,964, 13/970,990. This temperature measurement may be used, in some embodiments, to adjust the color and/or intensity of the light produced by the linear LED lamp 10 over changes in temperature.

FIG. 5 and FIG. 6 are just examples of many possible block diagrams for power supply board 20, emitter board 21, interface circuitry 32, and emitter module 33. In other embodiments, interface circuitry 32 could be configured to drive more or less LEDs 37, or may have multiple receiver channels. In yet other embodiments, emitter board 21 could be powered by a DC voltage, and as such, would not need AC/DC converter 30. Emitter module 33 could have more or less LEDs 37 configured in more or less chains, or more or less LEDs per chain. As such, FIG. 5 and FIG. 6 are just examples.

Figure 8:
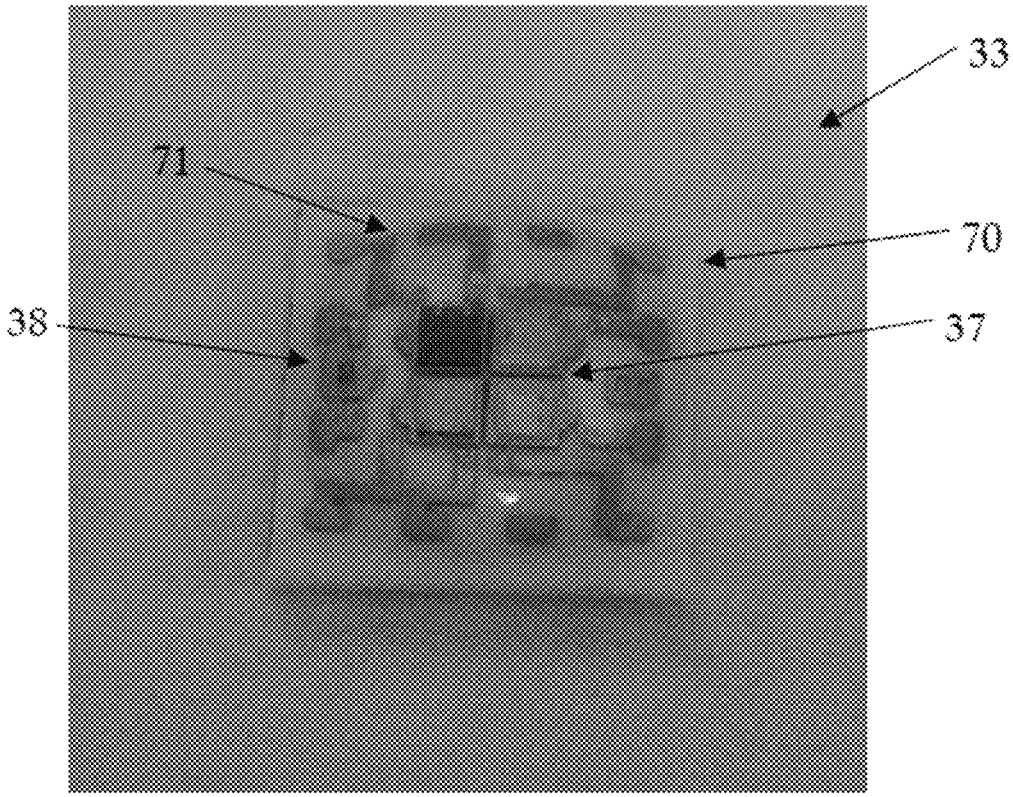
FIG. 8 is a photograph of an exemplary LED emitter module comprising a plurality of emission LEDs and a detector LED mounted on a substrate and encapsulated in a shallow dome.
Figure 9:
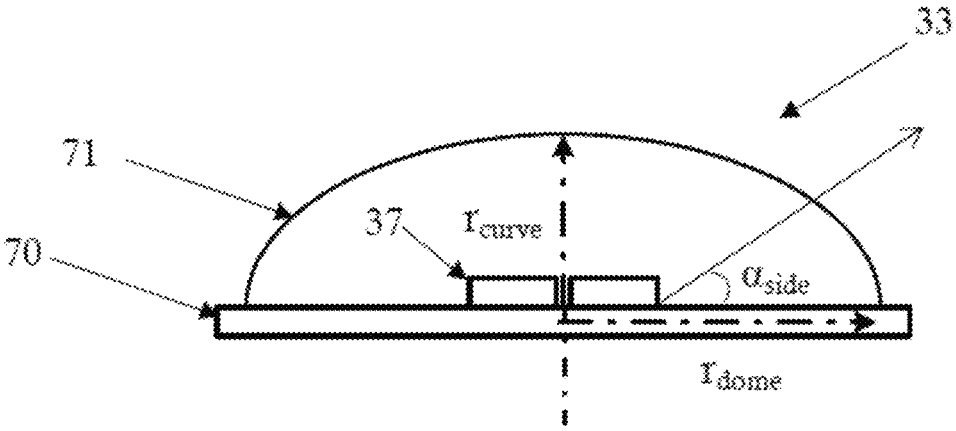
FIG. 9 is a side view drawing of the LED emitter module of FIG. 8.

FIGS. 8-9 depict an exemplary emitter module 33 that may be used to improve color mixing in the linear LED lamp 10. As shown in FIG. 8, emitter module 33 may include an array of four emission LEDs 37 and a detector 38, all of which are mounted on a common substrate 70 and encapsulated in a dome 71. In one embodiment, the substrate 70 may be a ceramic substrate formed from an aluminum nitride or an aluminum oxide material (or some other reflective material) and may generally function to improve output efficiency by reflecting light back out of the emitter module 33.

The dome 71 may comprise substantially any optically transmissive material, such as silicone or the like, and may be formed through an overmolding process, for example. In some embodiments, a surface of the dome 71 may be lightly textured to increase light scattering and promote color mixing, as well as to reflect a small amount (e.g., about 5%) of the emitted light back toward the detector 38 mounted on the substrate 70. The size of the dome 71 (i.e., the diameter of the dome in the plane of the LEDs) is generally dependent on the size of the LED array. However, it is generally desired that the diameter of the dome be substantially larger (e.g., about 1.5 to 4 times larger) than the diameter of the LED array to prevent occurrences of total internal reflection. As described in more detail below, the size and shape (or curvature) of the dome 71 is specifically designed to enhance color mixing between the plurality of emitter modules 33.

FIG. 9 depicts a side view of the emitter module 33 to illustrate a desired shape of the dome 71, according to one embodiment of the invention. As noted above, conventional emitter modules typically include a dome with a hemispherical shape, in which the radius of the dome in the plane of the LED array is the same as the radius of the curvature of dome. As shown in FIG. 9, dome 71 does not have the conventional hemispherical shape, and instead, is a much flatter or shallower dome. In general, the radius ($r_{dome}$) of the shallow dome 71 in the plane of the LED array is approximately 20-30% larger than the radius ($r_{curve}$) of the curvature of dome 71.

In one example, the radius ($r_{dome}$) of the shallow dome 71 in the plane of the LEDs may be approximately 4.8 mm and the radius ($r_{curve}$) of the dome curvature may be approximately 3.75 mm. The ratio of the two radii (4.8/3.75) is 1.28, which has been shown to provide the best balance between color mixing and efficiency for at least one particular combination and size of LEDs. However, one skilled in the art would understand how alternative radii and ratios may be used to achieve the same or similar color mixing results.

By configuring the dome 71 with a substantially flatter shape, the dome 71 shown in FIGS. 8-9 allows a larger portion of the emitted light to emanate sideways from the emitter module 33. Stated another way, a shallower dome 71 allows a significant portion of the emitted light to exit the dome at small angles ($\alpha_{side}$) relative to the horizontal plane of the LED array. In one example, the shallower dome 71 may allow approximately 40% of the light emitted by the array of LEDs 37 to exit the shallow dome at approximately 0 to 30 degrees relative to the horizontal plane of the LED array. In comparison, a conventional hemispherical dome may allow only 25% (or less) of the emitted light to exit between 0 and 30 degrees. As described in more detail below with reference to FIGS. 14-15, the shallow dome 71 shown in FIGS. 8-9 improves color mixing in the linear LED lamp 10 by allowing a significant portion (e.g., 40%) of the light emitted from the sides of adjacent emitter modules to intermix before that light is reflected back out of the lamp.

FIGS. 10A-10B are exemplary drawings of the emitter module 33 shown in FIGS. 8-9 including emission LEDs 37 and detector 38 within shallow dome 71. As shown in FIGS. 10A-10B, the four differently colored (e.g., red, green, blue and white) emission LEDs 37 are arranged in a square array and are placed as close as possible together in the center of the dome 71, so as to approximate a centrally located point source. As noted above, it is generally desired that the diameter ($d_{dome}$) of the dome 71 in the plane of the LEDs is substantially larger than the diameter ($d_{array}$) of the LED array to prevent occurrences of total internal reflection. In one example, the diameter ($d_{dome}$) of the dome 71 in the plane of the LEDs may be approximately 7.5 mm and the diameter ($d_{array}$) of the LED array may be approximately 2.5 mm. Other dimensions may be appropriate in other embodiments of the invention.

FIGS. 10A-10B also illustrate exemplary placements of the detector 38 relative to the array of emission LEDs 37 within the shallow dome 71. As shown in the embodiment of FIG. 10A, the detector 38 may be placed closest to, and in the middle of, the edge of the array that is furthest from the short wavelength emitters. In this example, the short wavelength emitters are the green and blue LEDs positioned at the top of the array, and the detector 38 is an orange LED, which is least sensitive to blue light. Although somewhat counterintuitive, it is desirable to place the detector 38 as far away as possible from the blue LED so as to gather the most light reflected off the surface of the shallow dome 71 from the blue LED. As noted above, a surface of the dome 71 may be lightly textured, in some embodiments, so as to increase the amount of emitted light that is reflected back to the detector 38.

FIG. 10B illustrates an alternative placement for the detector 38 within the shallow dome 71. In some embodiments, the best place for the detector 38 to capture the most light from the blue LED may be on the other side of the array, and diagonally across from, the blue LED. In the embodiment shown in FIG. 10B, the detector 38 is preferably placed somewhere between the dome 71 and a corner of the red LED. Since the green LED produces at least 10× the photocurrent as the blue LED on the orange detector, FIG. 10B represents an ideal location for an orange detector 38 in relation to the particular RGBW array 37 described above. However, the detector 38 may be positioned as shown in FIG. 10A, without sacrificing detection accuracy, if there is insufficient space between the dome 71 and the corner of the red LED, as shown in FIG. 10B.

FIG. 11 illustrates an exemplary emitter board 21 comprising six emitter modules 100, 101, 102, 103, 104, and 105 arranged in a line. Each of the emitter modules shown in FIG. 11 may be identical to the emitter module 33 shown in FIGS. 8-10 and described above. FIG. 11 illustrates a preferred method for altering the orientation of emitter modules, or sets of emitter modules, to further improve color mixing there between. In the embodiment of FIG. 11, the orientation of emitter modules 102 and 105 (i.e., a first set of emitter modules) is the same, the orientation of emitter modules 101 and 104 (i.e., a second set of emitter modules) is the same, and the orientation of emitter modules 100 and 103 (i.e., a third set of emitter modules) is the same. However, the orientation of the second set of emitter modules 101 and 104 is rotated 120 degrees from that of the first set of emitter modules 102 and 105. Likewise, the orientation of the third set of emitter modules 100 and 103 is rotated 120 degrees from that of the second set of emitter modules 101 and 104, and 240 degrees from the first set of emitter modules 102 and 105. This rotation in combination with the shallow curvature of dome 71 enables the various colors of light produced by the plurality of emitter modules 100, 101, 102, 103, 104, and 105 to thoroughly mix.

FIG. 11 is just one example of an emitter board 21 that may be used to improve color mixing in a linear LED lamp 10. Although the emitter board 21 is depicted in FIG. 11 with six emitter modules spaced approximately 2 inches apart, an emitter board 21 in accordance with the present invention could have substantially any number of emitter modules spaced substantially any distance apart. In embodiment shown in FIG. 11, three sets of emitter modules are rotated 120 degrees from each other. In other embodiments, however, one or more of the emitter modules could be rotated by any amount provided that the emitter modules on the emitter board 21 make an integer number of rotations along the length of emitter board 21.

For example, each emitter module may be rotated an additional X degrees from a preceding emitter module in the line. Generally speaking, X is a rotational angle equal to 360 degrees divided by an integer N, where N is greater than or equal to 3. The number N is dependent on the number of emitter modules included on the emitter board. For instance, with six emitter modules, each module could be rotated 60 or 120 degrees from the preceding emitter module. With eight emitter modules, each module could be rotated an additional 45 or 90 degrees. For best color mixing, the rotational angle X should be equal to 360 degrees divided by three or four depending on how many emitter modules are included on the emitter board 21.

FIG. 12 is a photograph of the emitter board 21 and reflector 22 placed within the emitter housing 11 of the linear LED lamp 10. In particular, FIG. 12 illustrates an exemplary placement of the emitter modules 33 and reflector 22 within emitter housing 11 for 120×120 degree beam applications. As noted above with regard to FIG. 11, each set of emitter modules 33 (e.g., modules 102/105, 101/104 and 100/103 shown in FIG. 11) may be rotated 120 degrees relative to each other to improve color mixing. In the embodiment of FIG. 12, the reflector 22 comprises a highly reflective material (e.g., vacuum metalized aluminum) that covers the entire inside of the emitter housing 11 except for the emitter modules 33. The reflector 22 used in this embodiment improves the overall optical efficiency of the lamp 10 by reflecting light scattered off the exit lens The rotation of the emitter modules 33, the shallow dome 71, and the shape of the exit lens 24 (discussed below) all contribute to produce thorough color mixing throughout the 120×120 beam in this example.

FIG. 13 is a photograph of the emitter board 21 and reflector 23 placed within the emitter housing 11. In particular, FIG. 13 illustrates an exemplary placement of the emitter modules 33 and reflector 23 within emitter housing 11 for 60×60 degree beam applications. As in FIG. 12, the sets of emitter modules 33 may be rotated 120 degrees relative to each other to improve color mixing. Like reflector 22, reflector 23 also comprises a highly reflective material (e.g., vacuum metalized aluminum) to improve optical efficiency, however, reflector 23 additionally includes a plurality of louvers, each of which is centered around and suspended above a different one of the emitter modules 33. As depicted more clearly in FIGS. 14-15, the louvers are attached to the reflector 23 only on the sides and ends, and are open below. The space between the emitter modules 33 and the bottom of the louvers allows light emitted sideways from the emitter modules 33 to intermix to improve color uniformity in the output beam.

FIG. 14 is an exemplary ray diagram illustrating the color mixing effect between emitter modules 100-105 and reflector 23. As shown in FIG. 14, louvers 110, 111, 112, 113, 114, and 115 are individually centered upon and positioned above a different emitter module. The louvers 110-115 focus a majority of the light emitted from the emitter modules 100-105 into an output beam, but allow some of the light that emanates from the side of the emitter modules 100-105 to mix with light from other emitter modules. For example, louver 112 focuses most of the light emitted from emitter module 102 into the output beam, however, some rays from emitter module 102 are reflected by louvers 111, 113, and 115. Likewise, louver 113 focuses most of the light emitted from emitter module 103; however, some rays from emitter module 103 are reflected by louvers 110, 112, and 114. The exemplary ray diagram of FIG. 14 illustrates only a limited number of rays. In reality, each louver 110-115 reflects some light from all emitter modules 100-105, which significantly improves color mixing in the resulting beam.

Figure 15:
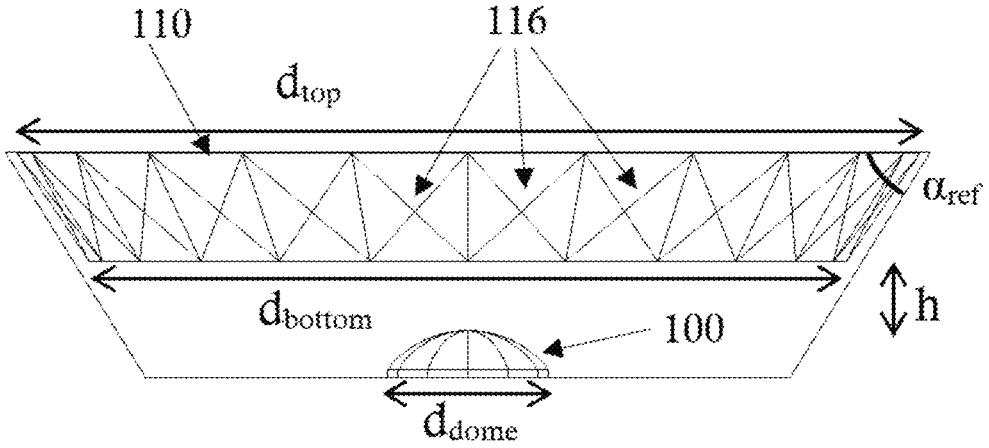
FIG. 15 is an exemplary drawing providing a close up view of one of the emitter modules and floating louvers shown in FIG. 14.

FIG. 15 illustrates a cross section of a portion of the exemplary 60×60 degree reflector 23 comprising louver 110 and emitter module 100. Louver 110 is attached to both lateral sides of reflector 23. The same is true for louvers 111-115. Additionally, louvers 110 and 115 are attached to the ends of reflector 23. In some embodiments, the louvers 110-115 may be attached to the sidewalls and ends of the reflector 23 by forming the louvers and reflector as one integral piece (e.g., by a molding process). Other means for attachment may be used in other embodiments of the invention.

The overall shape and size of the louvers 110-115 determine the shape, and to some extent the color, of the output beam. As shown in FIGS. 13-15, each louver has a substantially round or circular shape with sloping sidewalls. As shown in FIG. 15, the sidewalls of the louvers are angled outward, such that the diameter at the bottom of the louver ($d_{bottom}$) is substantially smaller than the diameter at the top of the louver ($d_{top}$). It is generally desired that the louvers 110-115 be substantially larger than the emitter modules 100-105, so that the louvers may focus a majority of the light emitted by the emitter modules into an output beam. As noted above, the diameter of the emitter module ($d_{emit}$) may be about 7.5 mm, in one embodiment. In such an embodiment, the bottom diameter ($d_{bottom}$) of the louver may be about 35 mm and the top diameter ($d_{top}$) of the louver may be about 42 mm. Other dimensions and shapes may be appropriate in other embodiments of the invention. In one alternative embodiment, for example, the louvers may alternatively be configured with a substantially parabolic shape, as would be appropriate in 30×60 beam applications.

As further depicted in FIG. 15, the angle ($\alpha_{ref}$) of the sidewalls of reflector 23 is substantially the same as the angle ($\alpha_{ref}$) of the sidewalls of the louvers 110-115. According to one embodiment, the angle of the sidewall surfaces of the reflector 23 and the angle of the louvers 110-115 may be approximately 60 degrees. In the illustrated embodiment, the shape and size of the reflector and louvers are chosen for 60×60 beam applications. One skilled in the art would understand how alternative shapes and sizes may be used to produce other beam shapes. As such, FIGS. 13-15 are just example illustrations of the invention.

As further shown in FIG. 15, the louvers (e.g., 110) are formed so as to include a plurality of planar facets, or lunes 116, in the sidewalls. Lunes 116 are flattened segments in the otherwise round louvers 110-115. The lunes 116 generally function to randomize the direction of the light rays and improve color mixing. FIG. 15 further depicts how the louvers (e.g., 110) are suspended some height (h) above the emitter modules (e.g., 100). The height (h) is generally dependent on the shape of the shallow dome 71 and the configuration of the lunes 116. According to one embodiment, the louvers 110-115 may be suspended approximately 5 mm to approximately 10 mm above the emitter modules 100-105 to allow a sufficient amount of light to mix underneath the louvers.

In addition the features described above (e.g., the flattened dome shape, the rotated emitter modules, the reflector with floating louvers, etc.), the exit lens 24 of the linear LED lamp 10 provides an additional measure of color mixing and beam shaping for the output beam. In general, the exit lens 24 is preferably configured with some combination of differently textured surfaces and/or patterns on opposing sides of the exit lens. The exit lens 24 preferably comprises injection modeled PMMA (acrylic), but could comprise substantially any other optically transparent material.

Figure 16:
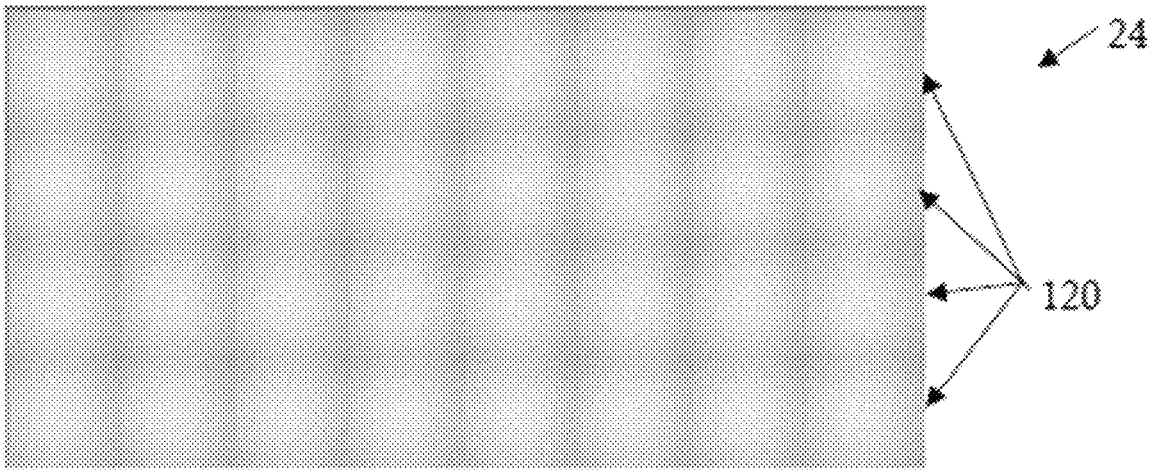
FIG. 16 is an exemplary drawing of an exit lens comprising a plurality of lenslets formed on an external surface of the lens, according to one embodiment.

FIGS. 16 and 17 illustrate one exemplary embodiment of an exit lens 24 comprising an internal surface having a flat roughened surface that diffuses the light passing through the exit lens, and an array of micro-lenses or lenslets 120 formed on an external surface of the lens. As shown in FIG. 16, the lenslets 120 may be rectangular or square-shaped domes, and may be approximately 1 mm square, but could have a variety of other shapes and sizes. The curvature of lenslets 120 is defined by the radius of the arcs that create the lenslets. In one embodiment, the radius of the lenslets 120 is about 1 mm. Although any combination of size, shape and curvature of lenslets 120 is possible, such dimensions have been shown to provide optimum color mixing and beam shaping performance.

FIG. 16 is just one example of an exit lens 24. One skilled in the art would understand how an exit lens may be alternatively configured to produce the same or similar color mixing results. In other embodiments, for example, the pattern on the exterior surface of the exit lens could be hexagonal instead of rectangular, and/or the diameter of the lenslets 120 could be different. Likewise, the curvature of the lenslets 120 could change significantly and still achieve the desired results. In general, the exit lens 24 described herein may provide improved color mixing with substantially any shape, any diameter, and any lenslet curvature by providing an array of lenslets on at least one side of the exit lens 24. In some embodiments, an array of similarly or differently configured lenslets may also be provided on the interior surface of the exit lens.

FIG. 17 illustrates a ray diagram for the exemplary exit lens 24 shown in FIG. 16. In this example, the light rays 130 from the emitter modules 33 enter the exit lens 24 through the flat roughened internal side and are diffused within the exit lens 24. The scattered light rays within the exit lens 24 are further randomized by the array of lenslets 120 formed on the external side of the exit lens to produce an output beam 131 with substantially uniform color throughout the beam.

It will be appreciated to those skilled in the art having the benefit of this disclosure that this invention is believed to provide color mixing optics and optical feedback to produce uniform color throughout the output light beam of a multi-color linear LED illumination device. More specifically, the invention provides an emitter module comprising a plurality of emission LEDs and a detector LED, all of which are mounted on a substrate and encapsulated in a shallow dome. The shallow dome allows a significant portion of the emitted light to emanate from the side of the emitter module, where it can mix with light from other emitter modules to improve color mixing. The invention further improves color mixing within a multi-color linear LED illumination device by rotating sets of the emitter modules relative to each other and providing a reflector comprising a plurality of floating louvers, which are centered upon and suspended above each of the emitter modules. The floating louvers allow a portion of the light emitted from each emitter module to mix with light from other emitter modules to produce uniform color throughout the resulting output beam. Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. An illumination device, comprising:

a plurality of emitter modules spaced apart from each other and arranged in a line, wherein each emitter module comprises an array of at least two different colors of light emitting diodes (LEDs), which are mounted on a substrate and encapsulated within a shallow dome, and wherein a flattened shape of the shallow dome allows a greater portion of light emitted by the array of LEDs to emanate sideways from the emitter module than a hemispherical shaped dome; and a reflector comprising a plurality of louvers, wherein each louver is centered upon and suspended a spaced distance above a different one of the emitter modules to focus a majority of light emitted by that emitter module into an output beam, and wherein each louver is configured to reflect the portion of the light that emanates sideways from adjacent emitter modules to improve color mixing in the output beam.

2. The illumination device as recited in claim 1, wherein a radius of the shallow dome in a plane of the array of LEDs is 20-30% larger than a radius of a curvature of the shallow dome, so that the portion of the light that emanates sideways from the emitter module exits the shallow dome at small angles relative to a plane of the LED array.

3. The illumination device as recited in claim 2, wherein approximately 40% of the light emitted by the array of LEDs exits the shallow dome at approximately 0 to 30 degrees relative to the plane of the LED array.

4. The illumination device as recited in claim 1, wherein a top diameter of each louver is substantially larger than a bottom diameter of the louver.

5. The illumination device as recited in claim 4, wherein the plurality of louvers each comprise a substantially circular shape with sloping sidewalls.

6. The illumination device as recited in claim 4, wherein the plurality of louvers each comprise sidewalls with a substantially parabolic shape.

7. The illumination device as recited in claim 4, wherein the louvers are configured to focus the majority of the light emitted by the emitter modules into the output beam by configuring the bottom diameter of the louvers to be substantially larger than a diameter of the emitter modules.

8. The illumination device as recited in claim 4, wherein the sloping sidewalls of the louvers include a plurality of planar facets, which are configured to randomize a direction of light reflected from the planar facets.

9. The illumination device as recited in claim 4, wherein the louvers are suspended approximately 5 mm to approximately 10 mm above the emitter modules to allow the portion of the light that emanates sideways from the emitter modules to mix underneath the louvers.

10. The illumination device as recited in claim 1, wherein the plurality of emitter modules comprise at least a first emitter module, a second emitter module, and a third emitter module, and wherein:

the second emitter module is spaced equally distant between the first and third emitter modules;

the second emitter module is rotated X degrees relative to the first emitter module;

the third emitter module is rotated 2X degrees relative to the first emitter module; and wherein X is a rotational angle equal to 360 degrees divided by an integer N, where N is greater than or equal to 3.

11. The illumination device as recited in claim 1, wherein the array of LEDs comprises at least four LEDs, which are mounted on the substrate close together and arranged in a square pattern near a center of the shallow dome.

12. The illumination device as recited in claim 11, wherein the array of LEDs comprises a red LED, a green LED, a blue LED and a white LED.

13. The illumination device as recited in claim 1, further comprising:

an emitter housing, wherein the plurality of emitter modules and the reflector reside within the emitter housing; and an exit lens mounted above the reflector and attached to sidewalls of the emitter housing.

14. The illumination device as recited in claim 13, wherein an internal surface of the exit lens comprises a flat roughened surface that scatters light rays passing through the exit lens, and wherein an external surface of the exit lens comprises an array of lenslets that randomizes the scattered light rays.

*15. An illumination device, comprising:*

*an emitter module comprising:*

*at least two light emitting diodes (LEDs) mounted on a substrate; and*

*a dome that encapsulates the at least two LEDs;*

*wherein a radius of the dome in a plane of the LEDs is greater than a radius of curvature of the dome; and*

*a reflector comprising a louver that is suspended a distance above the emitter module.*

*16. The illumination device of claim 15, further comprising a plurality of emitter modules including the emitter module, wherein the plurality of emitter modules are spaced apart from each other and arranged in a line.*

*17. The illumination device of claim 15, wherein the at least two LEDs comprise a two by two array of LEDs.*

*18. The illumination device of claim 15, wherein the distance of the louver above the emitter module is within a range of approximately 5 mm to approximately 10 mm.*

*19. The illumination device of claim 18, wherein the louver comprises sloped sidewalls, and wherein the sloped sidewalls include a plurality of planar facets.*

*20. The illumination device of claim 15, wherein the radius of the dome in the plane of the LEDs is greater than the radius of curvature of the dome by 20-30%.*

*21. The illumination device of claim 20, wherein approximately 40% of light emitted by the at least two LEDs exits the dome at approximately 0 to 30 degrees relative to the plane of the LEDs.*

*22. The illumination device of claim 16, wherein the plurality of emitter modules comprise at least a first emitter module, a second emitter module, and a third emitter module, and wherein:*

*the second emitter module is between the first emitter module and third emitter module;*

*the second emitter module is rotated X degrees relative to the first emitter module;*

*the third emitter module is rotated 2X degrees relative to the first emitter module; and*

*X is a rotational angle.*

*23. The illumination device of claim 15, wherein the louver comprises sloped sidewalls, and wherein the sloped sidewalls include a plurality of planar facets.*

*24. The illumination device of claim 15, wherein a top diameter of the louver is larger than a bottom diameter of the louver.*

*25. The illumination device of claim 24, wherein the louver comprises a substantially circular shape.*

*26. The illumination device of claim 24, wherein the louver comprises a substantially parabolic shape.*

*27. The illumination device of claim 24, wherein the bottom diameter of the louver is larger than a diameter of the emitter module.*

*28. The illumination device of claim 24, wherein the louver comprises sloped sidewalls, and wherein the sloped sidewalls include a plurality of planar facets.*

*29. The illumination device of claim 15, further comprising an exit lens mounted above the reflector, wherein an internal surface of the exit lens comprises a flat roughened surface that scatters light rays passing through the exit lens, and wherein an external surface of the exit lens comprises an array of lenslets that randomizes the scattered light rays.*

*30. The illumination device of claim 29, further comprising a plurality of emitter modules including the emitter module.*

*31. The illumination device of claim 30, wherein the plurality of emitter modules are spaced apart from each other and arranged in a line, wherein the plurality of emitter modules comprise at least a first emitter module, a second emitter module, and a third emitter module, and wherein:*

*the second emitter module is between the first emitter module and third emitter module;*

*the second emitter module is rotated X degrees relative to the first emitter module;*

*the third emitter module is rotated 2X degrees relative to the first emitter module; and*

*X is a rotational angle.*

*32. The illumination device of claim 31, wherein the distance of the louver above the emitter module is within a range of approximately 5 mm to approximately 10 mm.*

*33. The illumination device of claim 32, wherein the radius of the dome in the plane of the LEDs is greater than the radius of curvature of the dome by 20-30%.*

*34. The illumination device of claim 33, wherein a top diameter of the louver is larger than a bottom diameter of the louver.*

*35. The illumination device of claim 34, wherein the bottom diameter of the louver is larger than a diameter of the emitter module.*

* * * * *